United States Patent
Tanaka et al.

(10) Patent No.: US 10,444,928 B2
(45) Date of Patent: *Oct. 15, 2019

(54) DISPLAY DEVICE

(71) Applicant: Japan Display Inc., Tokyo (JP)

(72) Inventors: Hiroshi Tanaka, Tokyo (JP); Masahiro Teramoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 15/803,936

(22) Filed: Nov. 6, 2017

(65) Prior Publication Data

US 2018/0059827 A1 Mar. 1, 2018

Related U.S. Application Data

(63) Continuation of application No. 14/325,681, filed on Jul. 8, 2014, now Pat. No. 9,841,851.

(30) Foreign Application Priority Data

Jul. 10, 2013 (JP) ................................. 2013-144385

(51) Int. Cl.
    *G06F 3/044* (2006.01)
    *G06F 3/041* (2006.01)

(52) U.S. Cl.
    CPC ............ *G06F 3/0446* (2019.05); *G06F 3/044* (2013.01); *G06F 3/0412* (2013.01); *G06F 3/0418* (2013.01); *G06F 3/0445* (2019.05)

(58) Field of Classification Search
    CPC ............................... G06F 3/044; G06F 3/0416
    See application file for complete search history.

(56) References Cited

U.S. PATENT DOCUMENTS 5,565,658 A * 10/1996 Gerpheide .............. G06F 3/041
                                                         178/18.02
6,697,090 B1 * 2/2004 Nagasaka ............ G06F 3/0486
                                                         715/769

(Continued)

FOREIGN PATENT DOCUMENTS

JP    2003-511799 A    3/2003
JP    2009-244958 A    10/2009

(Continued)

OTHER PUBLICATIONS

Japanese Office Action dated Aug. 29, 2017 for corresponding JP Patent Application No. 2013-144385, with computer translation.

(Continued)

*Primary Examiner* — Patrick F Marinelli
(74) *Attorney, Agent, or Firm* — Michael Best & Friedrich LLP

(57) ABSTRACT

In a capacitive touch panel, edge regions of the panel display generally have poor accuracy of coordinate detection of a touch point as compared to the intermediate region of the panel display. A display device includes a plurality of first electrodes arranged at predetermined pitches and extending in a X-direction; and a plurality of second electrodes arranged at predetermined pitches and extending in a Y-direction, wherein both endmost first electrodes of the plurality of first electrodes have a smaller pitch than the other first electrodes, both endmost second electrodes of the plurality of second electrodes have a smaller pitch than the other second electrodes, and the display device is configured to detect a touch based on a capacitance variation at one or more of intersections of the plurality of first electrodes with the plurality of second electrodes.

5 Claims, 26 Drawing Sheets

(56) References Cited

U.S. PATENT DOCUMENTS

| | | | |
|---|---|---|---|
| 7,030,860 B1 | 4/2006 | Hsu et al. | |
| 8,797,281 B2* | 8/2014 | Simmons | G06F 3/0416 |
| | | | 345/173 |
| 9,019,231 B2* | 4/2015 | Minami | G06F 3/044 |
| | | | 345/173 |
| 9,069,409 B2* | 6/2015 | Chang | G06F 3/044 |
| 2010/0182273 A1* | 7/2010 | Noguchi | G02F 1/13338 |
| | | | 345/174 |
| 2010/0231531 A1* | 9/2010 | Yang | G06F 3/044 |
| | | | 345/173 |
| 2010/0231549 A1* | 9/2010 | Chien | G02F 1/13338 |
| | | | 345/174 |
| 2011/0310025 A1* | 12/2011 | Simmons | G06F 3/0416 |
| | | | 345/173 |
| 2012/0062486 A1* | 3/2012 | Rho | G06F 3/041 |
| | | | 345/173 |
| 2012/0075238 A1* | 3/2012 | Minami | G06F 3/044 |
| | | | 345/174 |
| 2012/0075239 A1* | 3/2012 | Azumi | G06F 3/044 |
| | | | 345/174 |
| 2012/0080217 A1* | 4/2012 | Kim | G06F 3/044 |
| | | | 174/256 |
| 2012/0098759 A1* | 4/2012 | Chang | G06F 3/0418 |
| | | | 345/173 |
| 2013/0049771 A1 | 2/2013 | Peng et al. | |
| 2014/0055379 A1* | 2/2014 | Ma | G06F 3/044 |
| | | | 345/173 |
| 2014/0218335 A1* | 8/2014 | Teranishi | G06F 3/044 |
| | | | 345/174 |
| 2015/0015538 A1* | 1/2015 | Tanaka | G06F 3/044 |
| | | | 345/174 |
| 2016/0188100 A1 | 6/2016 | Teranishi et al. | |

FOREIGN PATENT DOCUMENTS

| | | |
|---|---|---|
| JP | 2011-048663 A | 3/2011 |
| JP | 2011-516960 A | 5/2011 |
| JP | 2012-073783 A | 4/2012 |
| JP | 2012-164648 A | 8/2012 |
| JP | 2012-242989 A | 12/2012 |
| TW | 201227452 A | 7/2012 |

OTHER PUBLICATIONS

Taiwanese Office Action dated Jan. 21, 2016 for corresponding Taiwanese Patent Application No. 103121102.

* cited by examiner

Tx PULSE

COUPLING
CURRENT

INTEGRATED
OUTPUT

INTEGRATED
OUTPUT

- - - DURING TOUCH
——— DURING NO TOUCH

DISPLAY DEVICE

CROSS REFERENCE TO RELATED APPLICATIONS

This application is a continuation of U.S. patent application Ser. No. 14/325,681 filed Jul. 8, 2014. Further, this application claims priority from Japanese patent application JP2013-144385 filed on Jul. 10, 2013, the content of which is hereby incorporated by reference into this application.

BACKGROUND

The present disclosure relates to display devices and is applicable to, for example, display devices with touch panels.

A liquid crystal display device includes a liquid crystal display panel, wherein the liquid crystal display panel is formed by enclosing a liquid crystal composition between a pair of substrates. Meanwhile, various display devices have been mass-produced in which a touch panel is disposed as an input device at the front of a liquid crystal display panel. In order to detect an input (hereinafter referred to as a touch) to the touch panel, a technique using a variation in capacitance or resistance is proposed.

A touch panel of a type in which a capacitance variation can be detected is, specifically, a touch panel configured to detect a variation in the capacitance between a pair of electrodes disposed with an insulating film in between and is hereinafter referred to as a capacitive touch panel. Capacitive touch panels are classified into an external type provided outside the display panel (see, for example, JP-A-2003-511799 or its corresponding U.S. Pat. No. 7,030,860) and a built-in type provided inside the display panel. An example of the built-in type capacitive touch panel is a so-called in-cell display panel in which each of common electrodes (counter electrodes) for image display previously provided in the display panel is also used as one of a pair of electrodes for a touch sensor and the other electrode (touch detection electrode) of the pair is disposed crosswise with respect to the common electrode (see, for example, JP-A-2009-244958 or its corresponding US Patent Application No. 2010/0182273).

SUMMARY

The inventors conducted various studies on the capacitive touch panel and have found the following problem.

Specifically, in the capacitive touch panel, edge regions of the panel display have poor accuracy of coordinate detection of a touch point as compared to the intermediate region of the panel display.

A brief description will be given below of a summary of a representative one of aspects according to the present disclosure.

In a display device, endmost detection electrodes of a panel display of a touch panel are arranged at a smaller pitch than the other detection electrodes thereof.

With the aforementioned display device, the accuracy of coordinate detection in the edge regions of the panel display can be improved.

DESCRIPTION OF THE PREFERRED EMBODIMENTS

Figure 1:
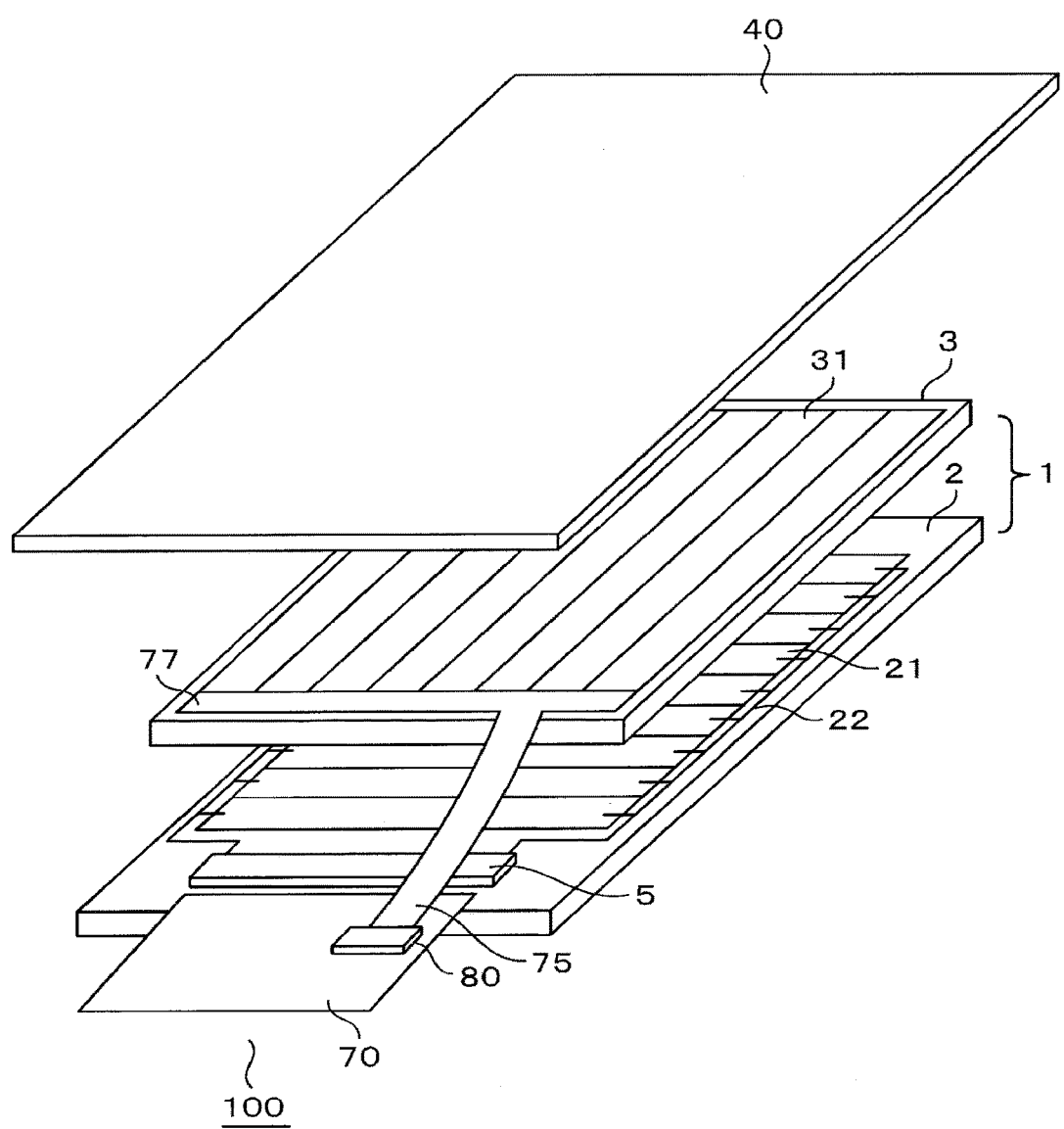
FIG. 1 is a schematic view showing a basic structure of a liquid crystal display device according to Embodiment 1.

Hereinafter, a description will be given of embodiments with reference to the drawings. Note that in all the drawings for illustrating the embodiments elements having the same functions are designated by the same reference characters and a description thereof will not be repeated.

Although in the following embodiments a display device will be described taking as an example a liquid crystal display device, the present disclosure is applicable to display devices of other types, such as an organic EL display device.

Embodiment 1

FIG. 1 is a schematic view showing a basic structure of a liquid crystal display device according to Embodiment 1. As shown in this figure, a liquid crystal display device 100 includes a liquid crystal display panel 1, a drive circuit 5, a flexible substrate 70, a front panel 40, a storage case (not shown), and a backlight (not shown).

The liquid crystal display panel 1 is formed by overlaying a TFT substrate (first substrate) 2 and a color filter substrate (second substrate) 3 at a predetermined distance from each other, bonding together both the substrates via a sealing material (not shown) placed in a frame shape between both the substrates along the peripheral edges of the substrates, filling a space within the frame-shaped sealing material with a liquid crystal composition, encapsulating the liquid crystal composition, and then attaching polarizing plates on the outside surfaces of both the substrates.

The TFT substrate 2 is provided with a plurality of counter electrodes 21 and a plurality of counter electrode signal lines 22 each connecting between the drive circuit 5 and an associated one of the plurality of counter electrodes 21. Thus, a counter electrode signal is transmitted from the drive circuit 5 through the counter electrode signal lines 22 to the counter electrodes 21. The color filter substrate 3 is provided with a plurality of detection electrodes 31. The detection electrodes 31 are connected at a connecting part 77 with a flexible substrate 75. The flexible substrate 75 is connected at a connector 80 with a flexible substrate 70. A detection signal from each detection electrode 31 is transmitted through the flexible substrate 75, the connector 80, and the flexible substrate 70 to the drive circuit 5.

The liquid crystal display panel 1 includes a display (to be described hereinafter in detail) including multiple pixels arranged in a matrix. The counter electrodes 21 constitute a common electrode and are disposed on the TFT substrate 2 to face pixel electrodes forming the pixels together with the counter electrodes 21. Specifically, the liquid crystal display panel 1 is of a lateral electric field type, such as FFS (fringe field switching) or IPS (in-plane switching). When a voltage is applied between both the electrodes forming each pixel, the orientation of liquid crystal molecules in the pixel changes. The proportion of light transmitting through the panel changes with the change in the orientation of liquid crystal molecules, so that an image is displayed.

Figure 2:
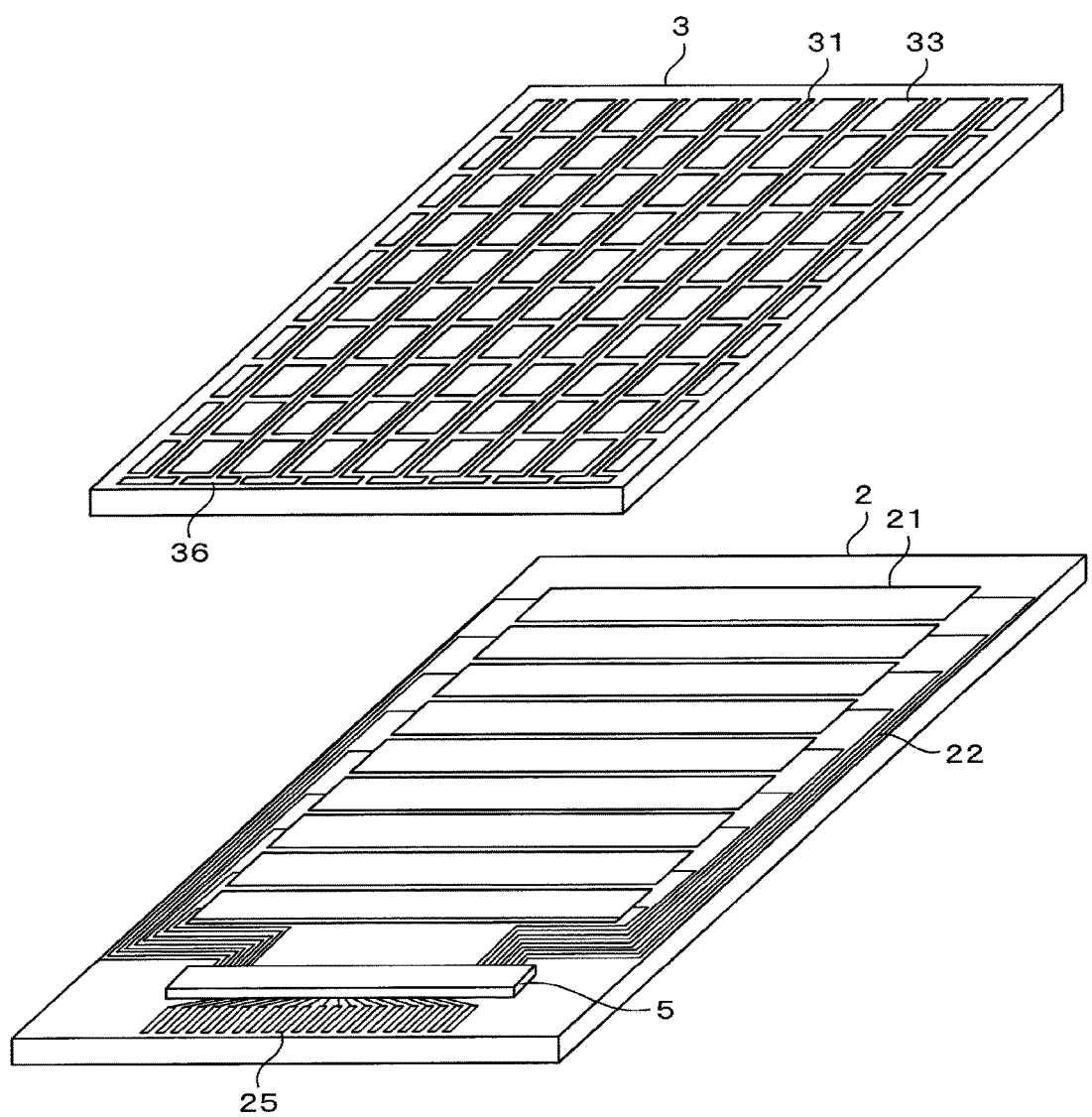
FIG. 2 is a schematic view showing a basic structure of a liquid crystal display panel according to Embodiment 1.

Next, a description will be given of the counter electrodes 21 and the detection electrodes 31 with reference to FIG. 2. Although, as described previously, the counter electrodes 21 constitute a common electrode provided on the TFT substrate 2, they are constructed by dividing the common electrode into a plurality of sections as shown in FIG. 2 so that they can be used as drive electrodes for detecting a touch. A counter electrode signal is supplied from the drive circuit 5 to the counter electrodes 21. Although the counter electrode signal applied to the counter electrodes 21 is mainly a voltage for the common electrode, a drive signal for use in detecting a touch is applied thereto with a timing when writing to the pixels is not performed.

When the drive signal is applied to the counter electrodes 21, the detection electrodes 31 disposed at a certain distance from the counter electrodes 21 and forming capacitors with the counter electrodes 21 generate detection signals. The detection signals are extracted through detection electrode terminals 36 to the outside.

Dummy electrodes 33 are formed on both sides of each detection electrode 31. The dummy electrodes 33 are connected neither to any electrode nor to any line. Each detection electrode 31 is extended at one end toward the adjacent two dummy electrodes 33 to form a T-shaped detection electrode terminal 36. The TFT substrate 2 has, in addition to the counter electrode signal lines 22, various lines and terminals formed thereon, such as drive circuit input terminals 25.

Figure 3:
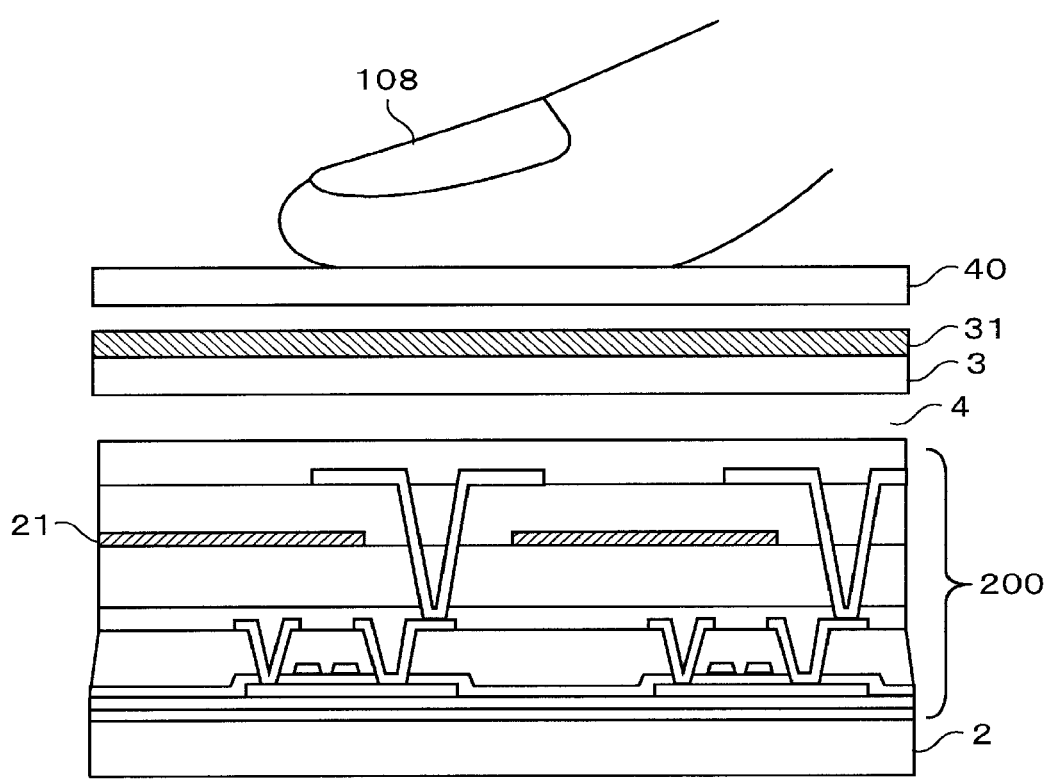
FIG. 3 is an enlarged schematic cross-sectional view showing a portion of a cross section of a display according to Embodiment 1.

FIG. 3 shows an enlarged schematic cross-sectional view of a portion of a cross section of the display. As shown in FIG. 3, the TFT substrate 2 is provided with a pixel section 200, in which the counter electrodes 21 form elements of pixels and are used for displaying an image. Furthermore, a liquid crystal composition (liquid crystal layer) 4 is sandwiched between the TFT substrate 2 and the color filter substrate 3. The detection electrodes 31 provided on the color filter substrate 3 and the counter electrodes 21 provided on the TFT substrate 2 form capacitors. Thus, when a drive signal is applied to the counter electrodes 21, the voltages of the detection electrodes 31 change. When at this time a conductor, such as a finger 108, comes close to or touches any one of the detection electrodes 31 through the front panel 40 as shown in FIG. 3, the capacitance between the detection electrode 31 and the associated counter electrode 21 changes, so that the voltage generated in the detection electrode 31 also changes as compared to before the conductor comes close to or touches it.

By detecting the capacitance variation occurring between the pair of counter electrode 21 and detection electrode 31 formed in the liquid crystal display panel 1, the liquid crystal display panel 1 can function as a touch panel.

Figure 4A:
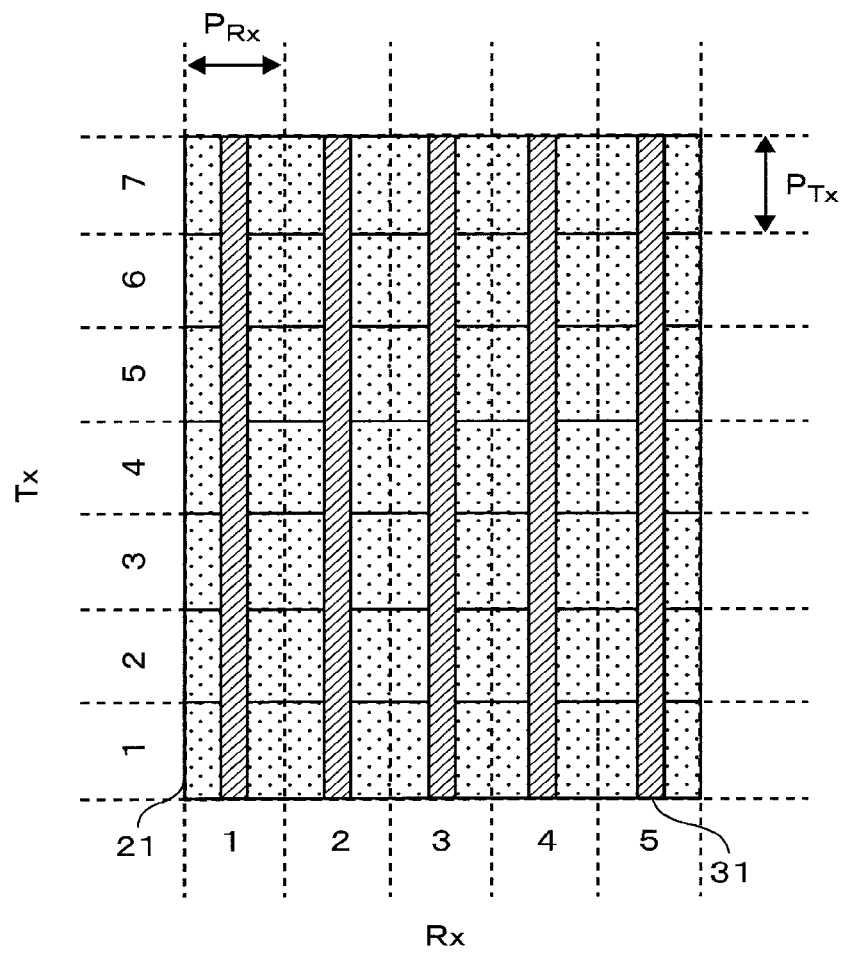
FIG. 4A is a plan view of a combination of a transmitting electrode pattern and a receiving electrode pattern according to Comparative Example 1.
Figure 4B:
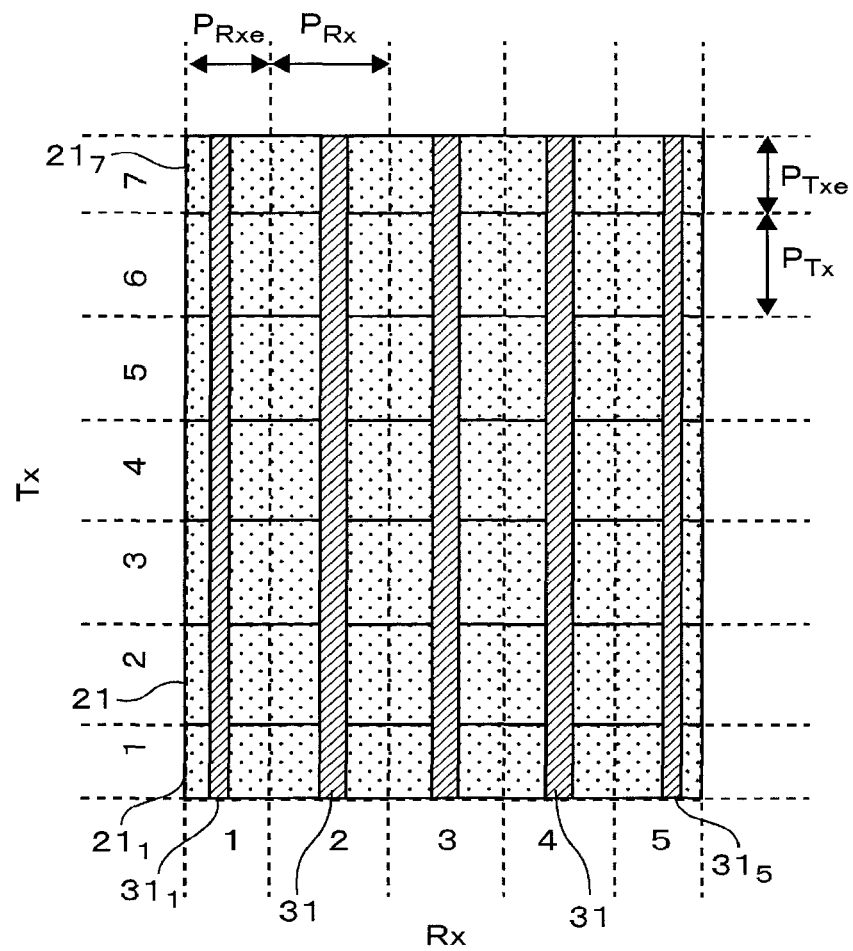
FIG. 4B is a plan view of a combination of a transmitting electrode pattern and a receiving electrode pattern according to Embodiment 1.
Figure 4C:
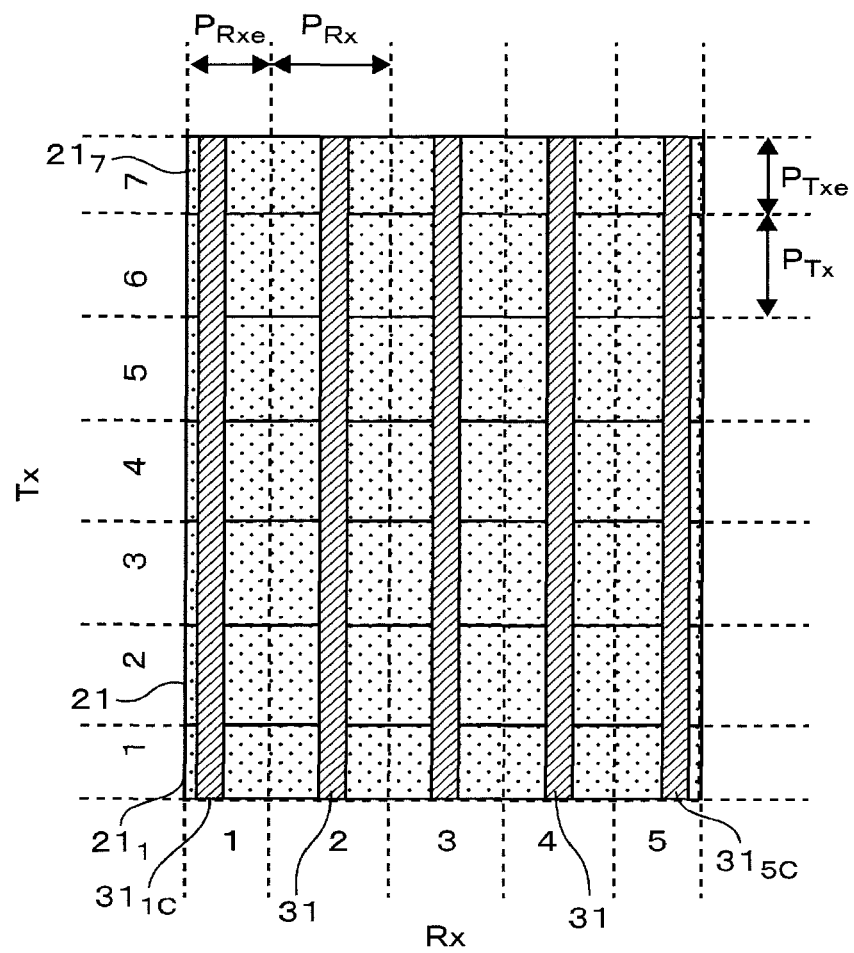
FIG. 4C is a plan view of another combination of a transmitting electrode pattern and a receiving electrode pattern according to Embodiment 1.
Figure 4D:
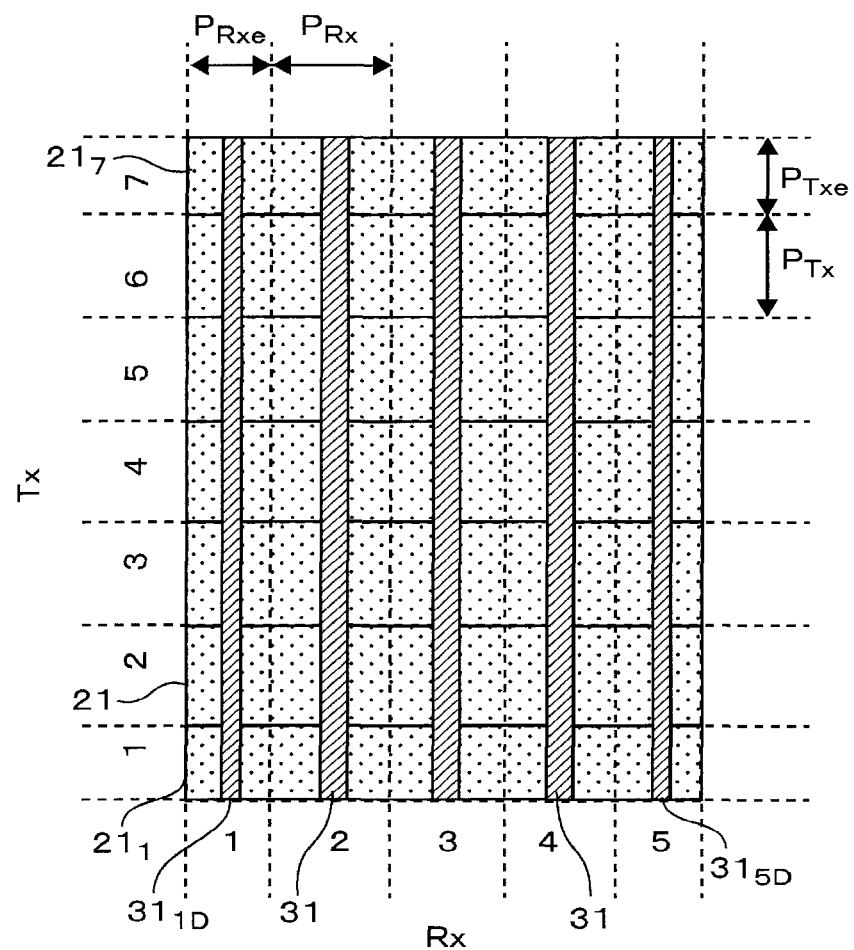
FIG. 4D is a plan view of still another combination of a transmitting electrode pattern and a receiving electrode pattern according to Embodiment 1.

FIGS. 4A to 4D are views schematically showing plane patterns of electrodes of a capacitive in-cell touch panel. For convenience of description, these figures show the case where the touch panel includes seven counter electrodes (transmitting electrodes, Tx electrodes or first electrodes) 21 and five detection electrodes (receiving electrodes, Rx electrodes or second electrodes) 31. FIG. 4A shows an ordinary electrode pattern (Comparative Example 1), FIG. 4B shows a first example of this embodiment where the pitch of the endmost electrodes is changed from that in the ordinary electrode pattern (the electrode pattern is tailored in edge regions), FIG. 4C shows a second example of this embodiment where the pitch of the endmost electrodes is changed (edge regions of the electrode pattern are simply cut), and FIG. 4D is a third example of this embodiment where the pitch of the endmost electrodes is changed (the electrode pattern is proportionally reduced in edge regions).

In Comparative Example 1 of FIG. 4A, all the Tx electrodes 21 have equal widths and equal spacings and all the Rx electrodes 31 also have equal widths and equal spacings. The width of each Tx electrode 21 is greater than the spacing between each pair of adjacent Tx electrodes 21, while the width of each Rx electrode 31 is smaller than the spacing between each pair of adjacent Rx electrodes 31. The pitch ($P_{Tx}$) of each Tx electrode 21 is the distance between the pair of adjacent horizontal broken lines. All the pitches ($P_{Tx}$) of the Tx electrodes 21 are equal. The pitch ($P_{Rx}$) of each Rx electrode 31 is the distance between the pair of adjacent vertical broken lines. All the pitches ($P_{Rx}$) of the Rx electrodes 31 are equal. Each Tx electrode 21 is located in the middle between the pair of adjacent horizontal broken lines, while each Rx electrode 31 is located in the middle between the pair of adjacent vertical lines.

In the first example of FIG. 4B where the pitch of the endmost electrodes is changed, the width of the endmost Tx electrodes (Tx1, Tx7) 21$_1$, 21$_7$ is smaller than the width of the other Tx electrodes 21 and the pitch ($P_{Txe}$) of the endmost Tx electrodes (Tx1, Tx7) 21$_1$, 21$_7$ is smaller than the pitch ($P_{Tx}$) of the other Tx electrodes 21 (i.e., $P_{Txe} < P_{Tx}$). Furthermore, the pitch ($P_{RXe}$) of the endmost Rx electrodes (Rx1, Rx5) 31$_1$, 31$_5$ is smaller than the pitch ($P_{Rx}$) of the other Rx electrodes 31 (i.e., $P_{RXe} < P_{Rx}$). The distance from each endmost Rx electrode (Rx1, Rx5) 31$_1$, 31$_5$ to the ends of the intersecting Tx electrodes in the X-direction is reduced. In other words, the endmost Rx electrodes (Rx1, Rx5) 31$_1$, 31$_5$ are offset from the middle between the pair of adjacent vertical broken lines towards the ends of the intersecting Tx electrodes in the X-direction. In this case, leaving the distance between each endmost Rx electrode (for example, Rx1) and the adjacent Rx electrode (for example, Rx2) unchanged from the distance between the other pairs of adjacent Rx electrodes is an ingenuity of avoiding a change of sensitivity of the Rx electrode (Rx2) next to the endmost Rx electrode (Rx1). Furthermore, in proportion to the pitch reduction, the width of the endmost Rx electrodes 31$_1$, 31$_5$ is reduced. Although the pitch reduction may cause a deterioration in the sensitivity of the endmost electrodes, the concurrent width reduction of the endmost Rx electrodes 31$_1$, 31$_5$ reduces the sensitivity deterioration.

In the second example of FIG. 4C where the pitch of the endmost electrodes is changed, the pattern of the endmost Tx electrodes and the pattern of the endmost Rx electrodes are simply cut. Although also in FIG. 4C the pitch ($P_{Rxe}$) of the endmost Rx electrodes 31$_{1C}$, 31$_{5C}$ is smaller than the pitch ($P_{Rx}$) of the other Rx electrodes 31, FIG. 4C is different from FIG. 4B in that the width of the endmost Rx electrodes 31$_{1C}$, 31$_{5C}$ is equal to the other Rx electrodes 31. In this case, the sensitivity is reduced as compared to the case of FIG. 4B but the coordinate accuracy can be effectively improved. The pitches and widths of the Tx electrodes are the same as in FIG. 4B.

In the third example of FIG. 4D where the pitch of the endmost electrodes is changed, the pattern of the endmost Tx electrodes and the pattern of the endmost Rx electrodes are proportionally reduced. Although also in FIG. 4D the pitch ($P_{Rxe}$) of the endmost Rx electrodes is smaller than the pitch ($P_{Rx}$) of the other Rx electrodes, FIG. 4D is different from FIG. 4B in the following point: since the regions of the endmost Rx electrodes 31$_{1D}$, 31$_{5D}$ are proportionally reduced, the distance between each endmost Rx electrode 31$_{1D}$, 31$_{5D}$ and the adjacent Rx electrode 31 is different from the distance between the other pairs of adjacent Rx electrodes. In this case, the sensitivity of the electrodes next to the endmost electrodes is slightly reduced but the coordinate accuracy can be effectively improved. Since the regions of the endmost Rx electrodes 31$_{1D}$, 31$_{5D}$ are proportionally reduced, the width of the endmost Rx electrodes 31$_{1D}$, 31$_{5D}$ is smaller than the width of the other Rx electrodes 31 and each endmost Rx electrode (Rx1, Rx5) 31$_{1D}$, 31$_{5D}$ is located in the middle between the pair of adjacent vertical broken lines. The pitches and widths of the Tx electrodes are the same as in FIG. 4B.

<Principle of Coordinate Accuracy Improvement>

The reason why the coordinate accuracy is improved by reducing the pitch of the endmost electrodes is that the area where only one endmost electrode responses to a touch on a near-edge point of the panel is reduced and a plurality of electrodes can response to the touch. This will be described next.

A method commonly used to calculate the coordinate of a touch point is to reckon as a touch detection coordinate the centroid of some response values to a touch on one or more of intersections of Tx electrodes with Rx electrodes (Tx-Rx intersections). This method is also assumed for the present disclosure. For simplicity of description, the pitch ($P_{Tx}$) of the Tx electrodes and the pitch ($P_{Rx}$) of the Rx electrodes are supposed to be equal to each other and the diameter (=2r) of a pseudo finger touching the panel is supposed to be also equal to the pitch of the electrodes. A difference of touches on near-edge points of the panel from touches on intermediate points of the panel is that no electrode exists on one side of the touch point.

Figure 5:
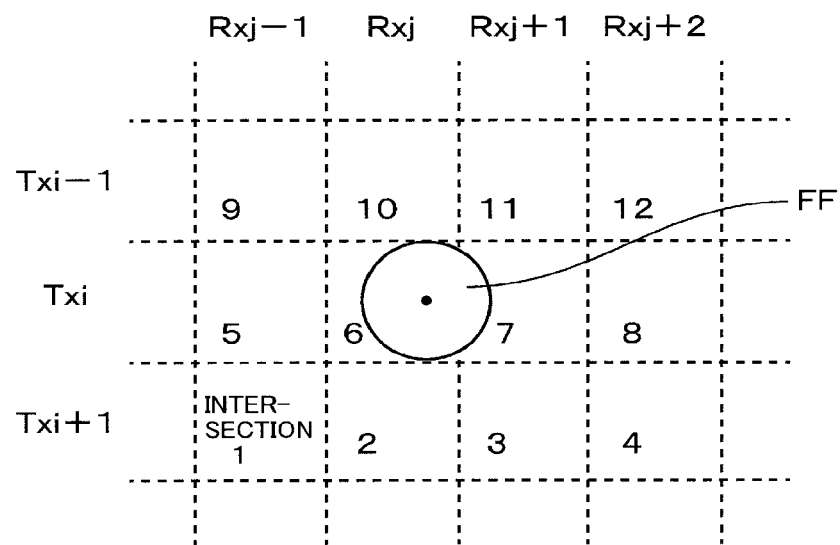
FIG. 5 is a view showing touch responses at a central point of the panel.
Figure 5:
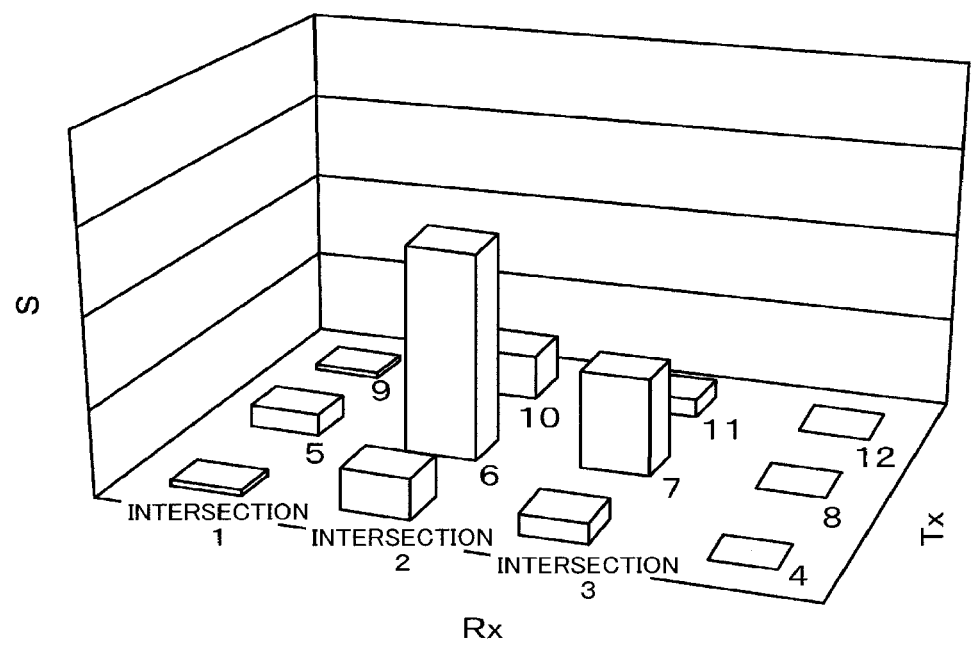
Figure 6:
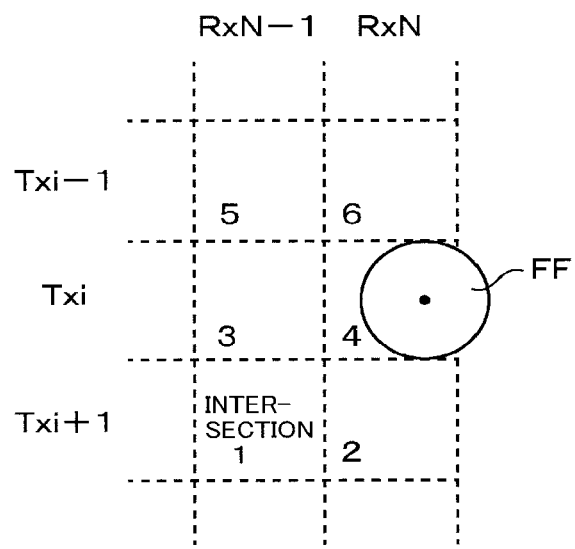
FIG. 6 is a view showing touch responses at a near-edge point of the panel according to Comparative Example 1.
Figure 6:
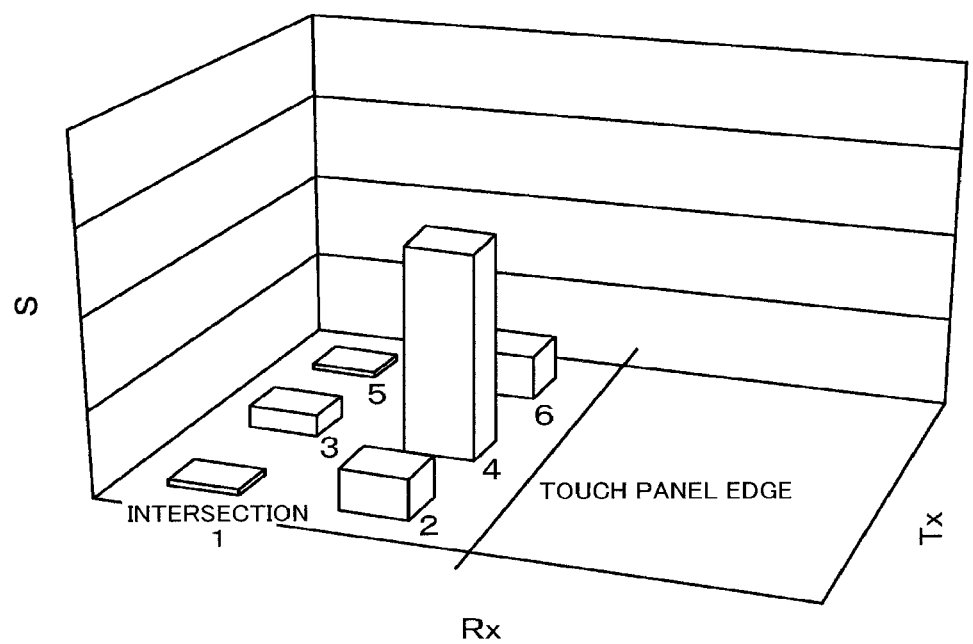

FIG. 5 is a view showing responses to a touch on a central point of the panel. The upper diagram of FIG. 5 shows a touch point on the panel and the lower diagram of FIG. 5 shows response values to the touch. As shown in the upper diagram of FIG. 5, the center of the pseudo finger FF is located within Intersection 6 but the pseudo finger FF extends to Intersection 7. As shown in the lower diagram of FIG. 5, a touch on the central point of the panel provides significant responses at Intersection 6 and Intersection 7. Therefore, the center of the touch point can be accurately calculated using the aforementioned centroid calculation. FIG. 6 is a view showing responses to a touch on a near-edge point of the panel according to Comparative Example 1. The upper diagram of FIG. 6 shows a touch point on the panel and the lower diagram of FIG. 6 shows response values to the touch. As shown in the upper diagram of FIG. 6, the center of the pseudo finger FF is located within Intersection 4 but the pseudo finger FF extends beyond the edge to the outside. As shown in the lower diagram of FIG. 6, a touch on the near-edge point of the panel provides a significant response only at Intersection 4. Therefore, the detection accuracy in the horizontal direction is poor. As described previously, each electrode is located between the adjacent broken lines.

Figure 7A:
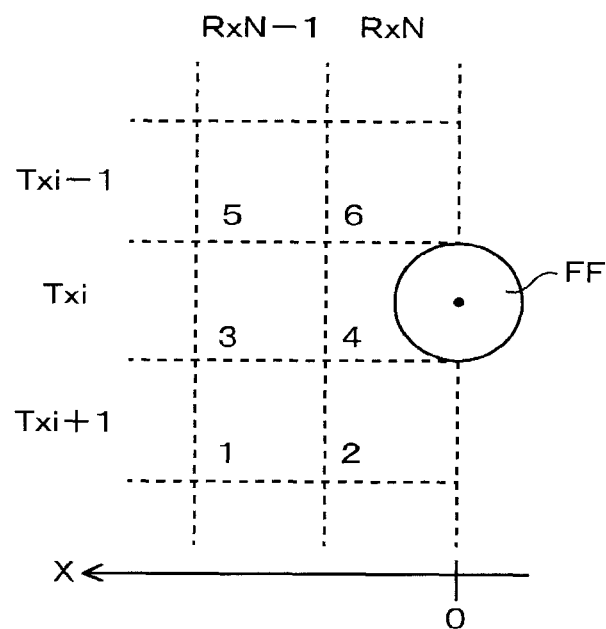
FIG. 7A is a view showing touch responses at an edge point of the panel according to Comparative Example 1.
Figure 7A:
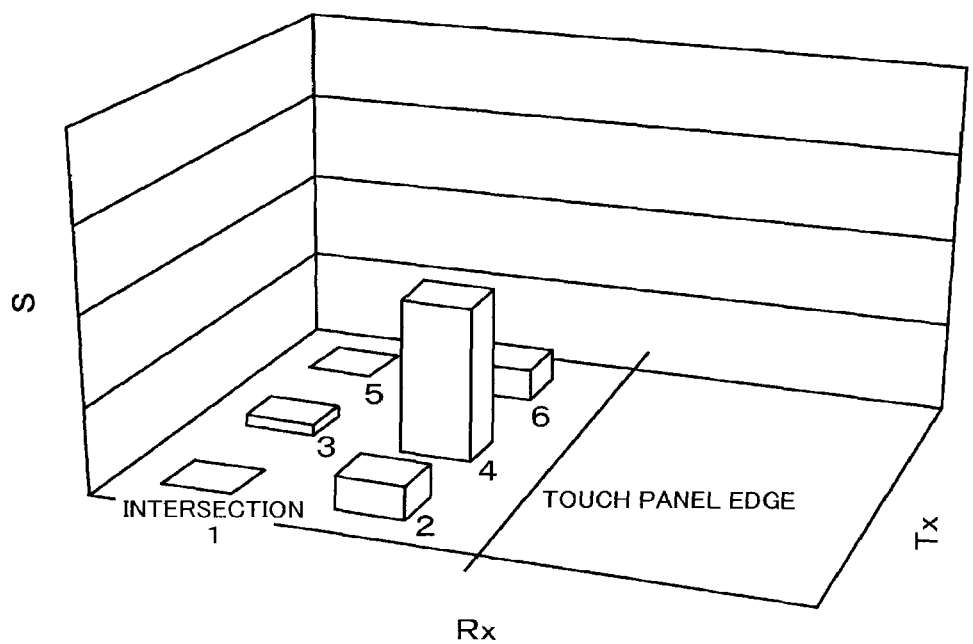
Figure 7B:
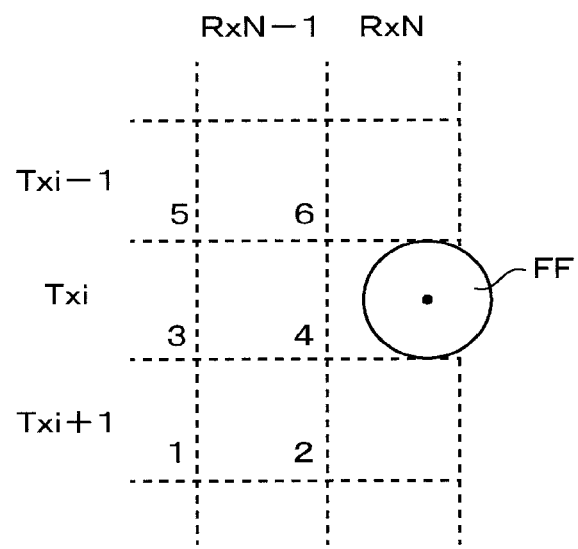
FIG. 7B is a view showing touch responses at a near-edge point of the panel according to Comparative Example 1.
Figure 7B:
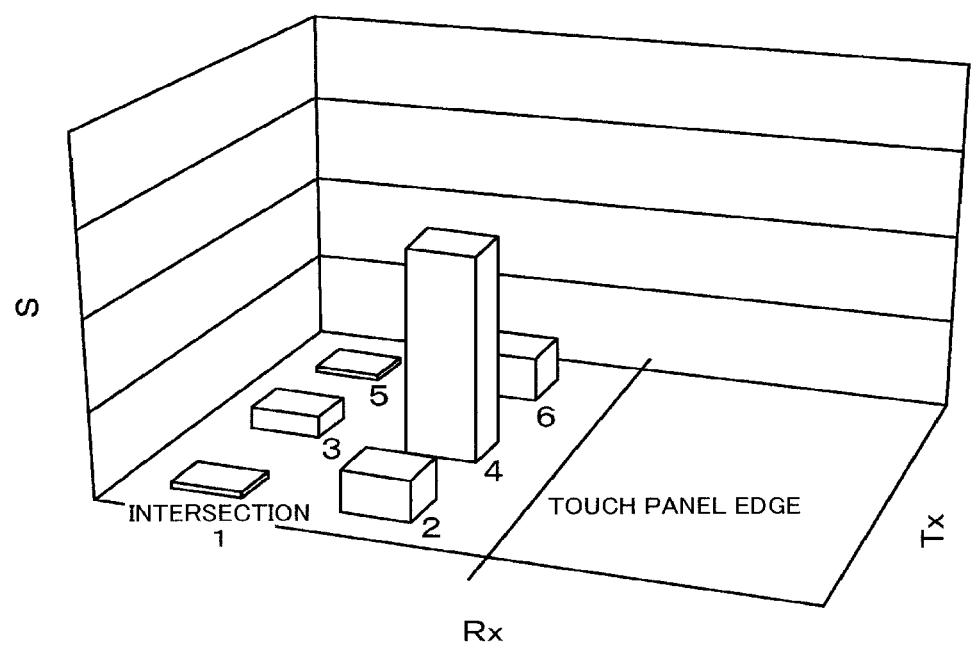
Figure 7C:
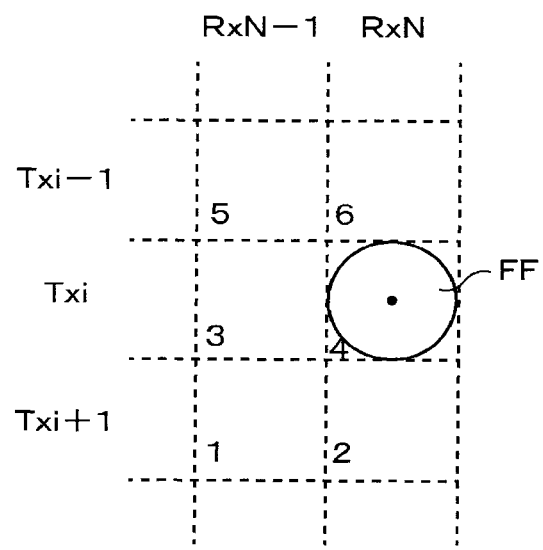
FIG. 7C is a view showing touch responses at another near-edge point of the panel according to Comparative Example 1.
Figure 7C:
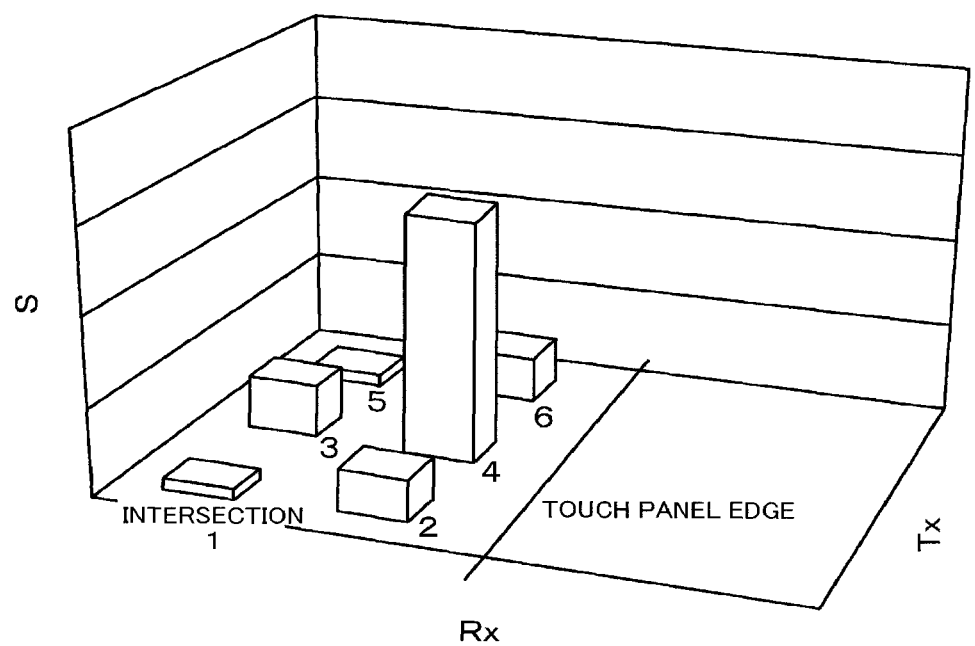

This will be described more specifically with reference to FIGS. 7A to 7C. FIG. 7A is a view showing responses to a touch on an edge point (x=0) of the panel according to Comparative Example 1. The upper diagram of FIG. 7A shows a touch point on the panel and the lower diagram of FIG. 7A shows response values to the touch. As shown in the upper diagram of FIG. 7A, the center of the pseudo finger FF is located at an edge (x=0) of the panel. As shown in the lower diagram of FIG. 7A, when the touch point is at x=0, only intersections (Intersections 2, 4, and 6) of the electrode R×N respond. FIG. 7B is a view showing responses to a touch on a point (x=r/2) r/2 distant from an edge of the panel according to Comparative Example 1. The upper diagram of FIG. 7B shows a touch point on the panel and the lower diagram of FIG. 7B shows response values to the touch. As shown in the upper diagram of FIG. 7B, the center of the pseudo finger FF is located at a near-edge point (x=r/2) of the panel. As shown in the lower diagram of FIG. 7B, when the touch point is at x=r/2, Intersection 3 slightly responds but its response level is not significantly different from a noise level, which does not contribute to the coordinate calculation. As a result, in edge regions of the panel, only one electrode R×N responds to touches on points from x=0 to x=r/2, so that a difference in position in the X-direction cannot be detected. In other words, in the range of touch points from x=0 to x=r/2, the position of the detected coordinate stays unchanged. This is the reason why the coordinate accuracy in the edge regions of the panel becomes poor. FIG. 7C is a view showing responses to a touch on a point (x=r) r distant from an edge of the panel according to Comparative Example 1. The upper diagram of FIG. 7C shows a touch point on the panel and the lower diagram of FIG. 7C shows response values to the touch. As shown in the upper diagram of FIG. 7C, the center of the pseudo finger FF is located at a near-edge point (x=r) of the panel. As shown in the lower diagram of FIG. 7C, when the touch point is at x=r, Intersection 3 provides a sufficiently significant response value, which contributes to the coordinate calculation.

Figure 8A:
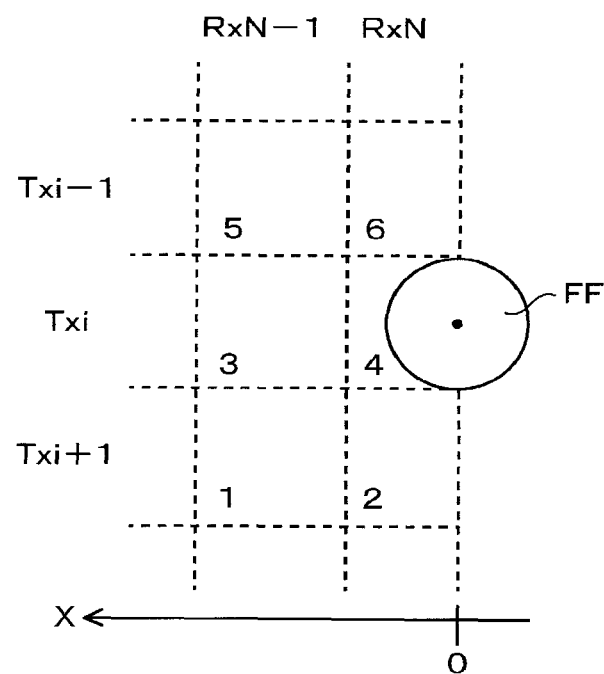
FIG. 8A is a view showing touch responses at an edge point of the panel according to Embodiment 1.
Figure 8A:
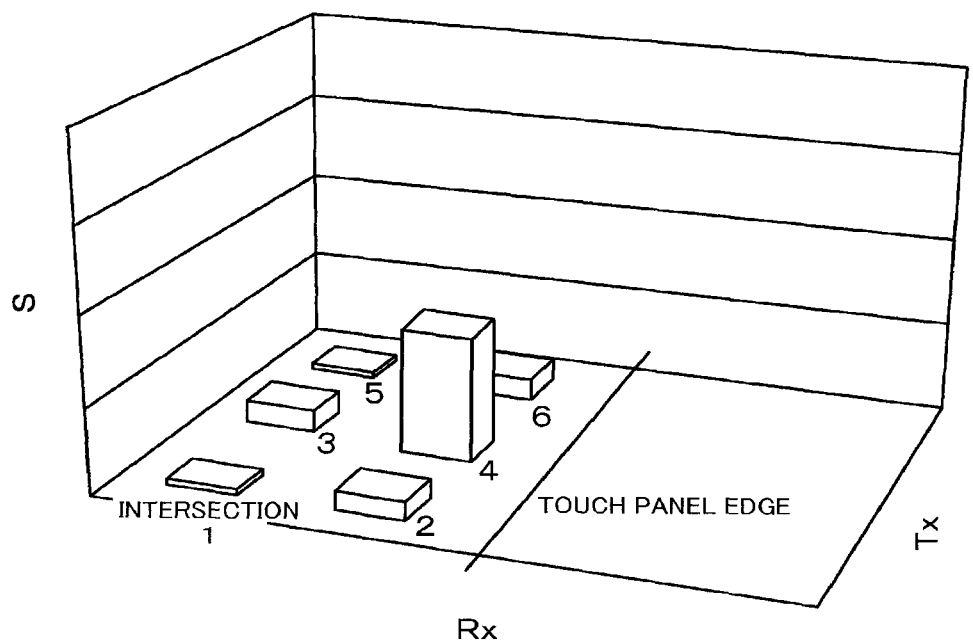
Figure 8B:
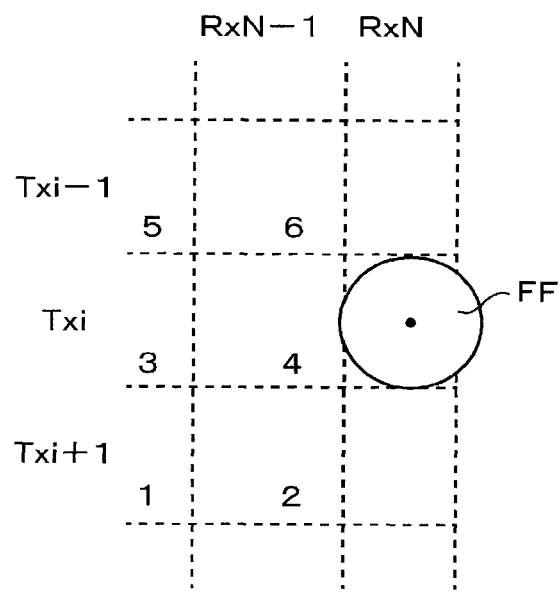
FIG. 8B is a view showing touch responses at a near-edge point of the panel according to Embodiment 1.
Figure 8B:
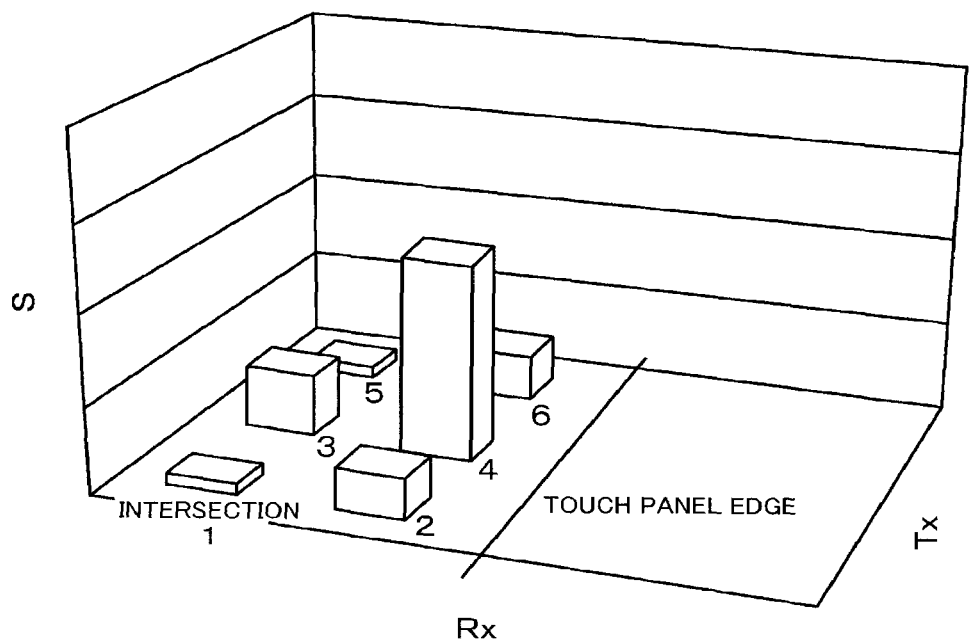
Figure 8C:
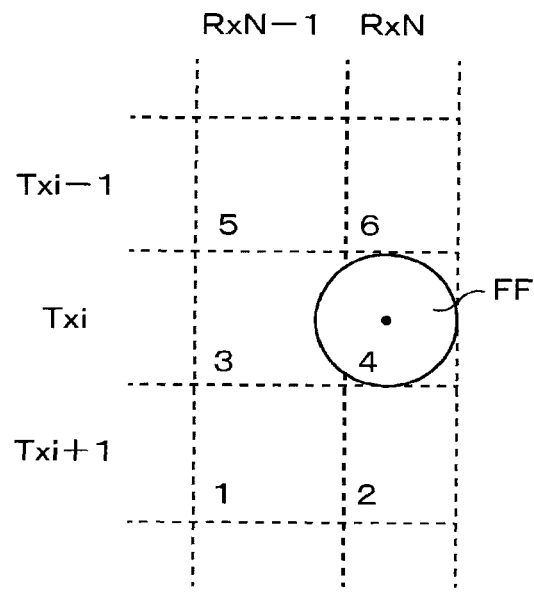
FIG. 8C is a view showing touch responses at another near-edge point of the panel according to Embodiment 1.
Figure 8C:
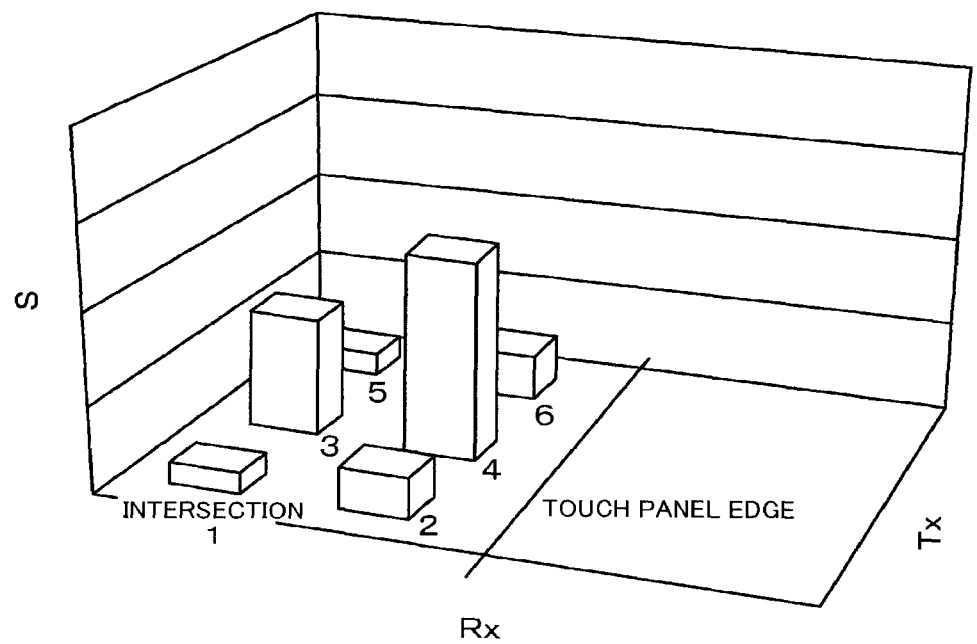

Touch responses in the case where the pitch of endmost electrodes is reduced are shown in FIGS. 8A to 8C. FIG. 8A is a view showing responses to a touch on an edge point (x=0) of the panel according to Embodiment 1. The upper diagram of FIG. 8A shows a touch point on the panel and the lower diagram of FIG. 8A shows response values to the touch. As shown in the upper diagram of FIG. 8A, the center of the pseudo finger FF is located at an edge (x=0) of the panel. As shown in the lower diagram of FIG. BA, when the touch point is at x=0, Intersection 4 has a smaller response value than Intersection 4 in the lower diagram of FIG. 7A but Intersection 3 already responds to some degree. FIG. 8B is a view showing responses to a touch on a point (x=r/2) r/2 distant from an edge of the panel according to Embodiment 1. The upper diagram of FIG. 8B shows a touch point on the panel and the lower diagram of FIG. 8B shows response values to the touch. As shown in the upper diagram of FIG. 8B, the center of the pseudo finger FF is located at a near-edge point (x=r/2) of the panel. As shown in the lower diagram of FIG. 8B, when the touch point is at x=r/2, Intersection 3 already provides a sufficiently significant response value, which contributes to the centroid calculation. FIG. 8C is a view showing responses to a touch on a point (x=r) r distant from an edge of the panel according to Embodiment 1. The upper diagram of FIG. 8C shows a touch point on the panel and the lower diagram of FIG. 8C shows response values to the touch. As shown in the upper diagram of FIG. 8C, the center of the pseudo finger FF is located at a near-edge point (x=r) of the panel. As shown in the lower diagram of FIG. 8C, when the touch point is at x=r, Intersection 3 provides a sufficiently significant response value, which contributes to the coordinate calculation. As seen from the above, in the cases where the pitch of endmost electrodes is reduced in the above manners, a change in touch point can be detected even when the touch point is at or near x=0. For the above reasons, the coordinate accuracy in the edge regions of the panel can be improved.

Although the above description has been given taking as an example the endmost Rx electrodes, the same applies to the endmost Tx electrodes. The above improvement in the accuracy of coordinate detection enables that when a line or a figure is drawn on the touch panel, the same trace as drawn by a touch, even near the edges of the panel display, is output without distortion.

<Sensitivity Correction>

Since a change in the pitch of the endmost electrodes involves a change in the sensitivity of them, the sensitivity is corrected by software during the coordinate calculation. The sensitivity of a Tx-Rx intersection is roughly proportional to the area of the intersection ((Tx pitch)×(Rx pitch)). Therefore, the four corner intersections have the minimum sensitivity when the pitch of the endmost Tx electrodes and the pitch of the endmost Rx electrodes are reduced. Even if their sensitivities are corrected by software, their noise cannot be corrected. Therefore, it is necessary to achieve a satisfactory S/N ratio at the four corner intersections. This condition of the S/N ratio determines the limit of reduction of the pitch.

Figure 9:
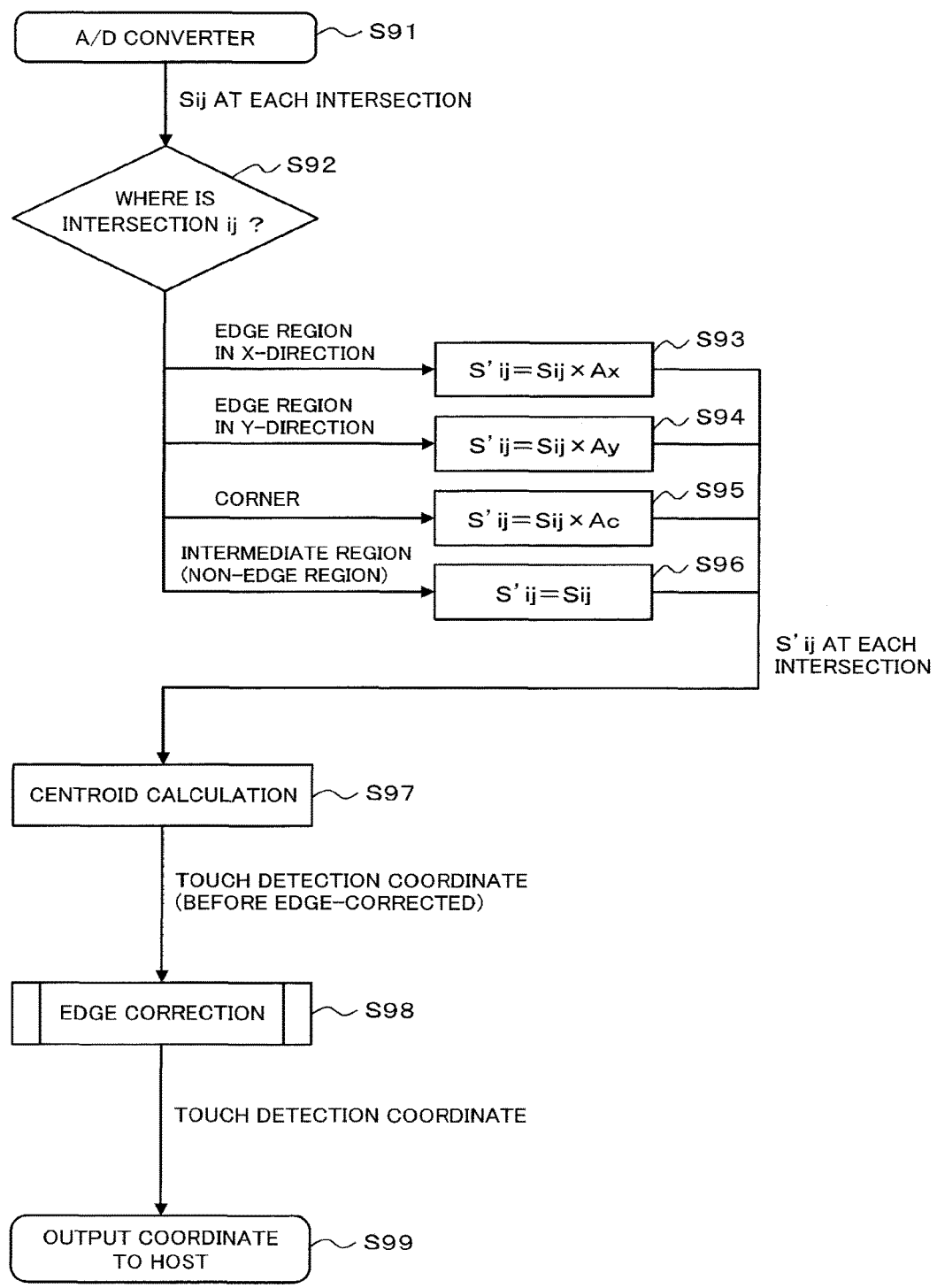
FIG. 9 is a flowchart of sensitivity correction according to Embodiment 1.

FIG. 9 is a flowchart of the sensitivity correction. First, respective touch response values $S_{ij}$ at some Tx-Rx intersections are acquired from an A/D converter (Step S91). Because the correction value for sensitivity varies with the position of the Tx-Rx intersection, it is determined where each Tx-Rx intersection is located (Step S92). The touch response value at an intersection (i,j) is designated by $S_{ij}$, the touch response value corrected in sensitivity is designated by $S'_{ij}$, the correction value for sensitivity in edge regions in the X-direction is designated by Ax, the correction value for sensitivity in edge regions in the Y-direction is designated by Ay, and the correction value for sensitivity at corners is designated by Ac. If there is no touch, $S_{ij}$=0 but $S_{ij}$ is not always zero because of the presence of noise. If the intersection is in either one of the edge regions in the X-direction, $S'_{ij}=S_{ij} \times Ax$ (Step S93) where Ax is approximately equal to ((the pitch of intermediate electrodes in the X-direction)/(the pitch of endmost electrodes in the X-direction)). If the intersection is in either one of the edge regions in the Y-direction, $S'_{ij}=S_{ij} \times Ay$ (Step S94) where Ay is approximately equal to ((the pitch of intermediate electrodes in the Y-direction)/(the pitch of endmost electrodes in the Y-direction)). If the intersection is at any one of the corners, $S'_{ij}=S_{ij} \times Ac$ (Step S95) where Ac is approximately equal to Ax×Ay. If the intersection is in the intermediate region (non-edge region), $S'_{ij}=S_{ij}$, i.e., no correction is made (Step S96). The centroid of the touch response values $S'_{ij}$ at the intersections is calculated to obtain a touch detection coordinate (Step S97). The touch detection coordinate obtained by the centroid calculation is subjected to an edge correction (Step S98). The coordinate subjected to the edge correction as described hereinafter is output to a host (Step S99).

<Edge Correction>

Figure 10A:
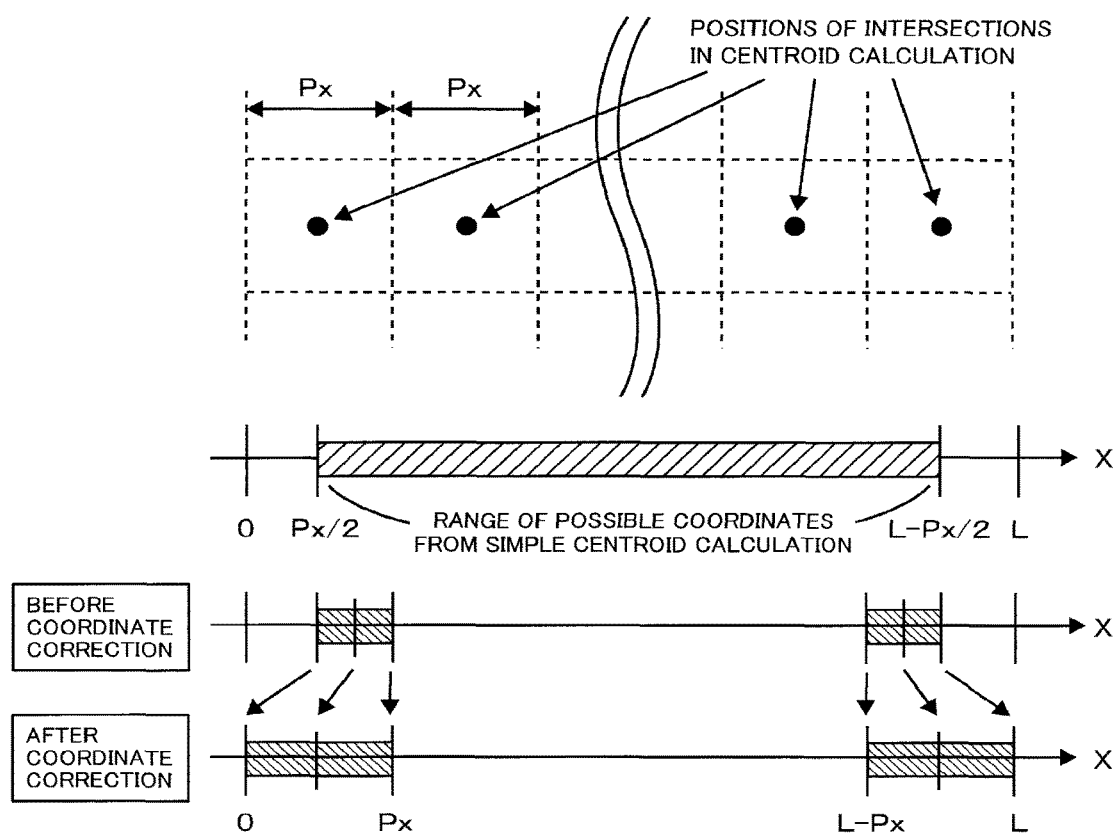
FIG. 10A is a diagram for illustrating a peripheral coordinate correction according to Comparative Example 1.

FIG. 10A is a diagram for illustrating a peripheral coordinate correction according to Comparative Example 1. Where the pitch of the electrodes in the X-direction is Px, the intersection pitch for use in the centroid calculation in the ordinary electrode pattern (Comparative Example 1) is also Px. Where the entire length of the pattern in the X-direction is L, the range of possible touch coordinates resulting from a simple centroid calculation is from Px/2 to L−Px/2. In this case, a correction is made by converting a coordinate of Px/2 to Px into 0 to Px and a coordinate of L−Px to L−Px/2 into L−Px to L. This correction is referred to as an edge correction or a peripheral coordinate correction.

Figure 10B:
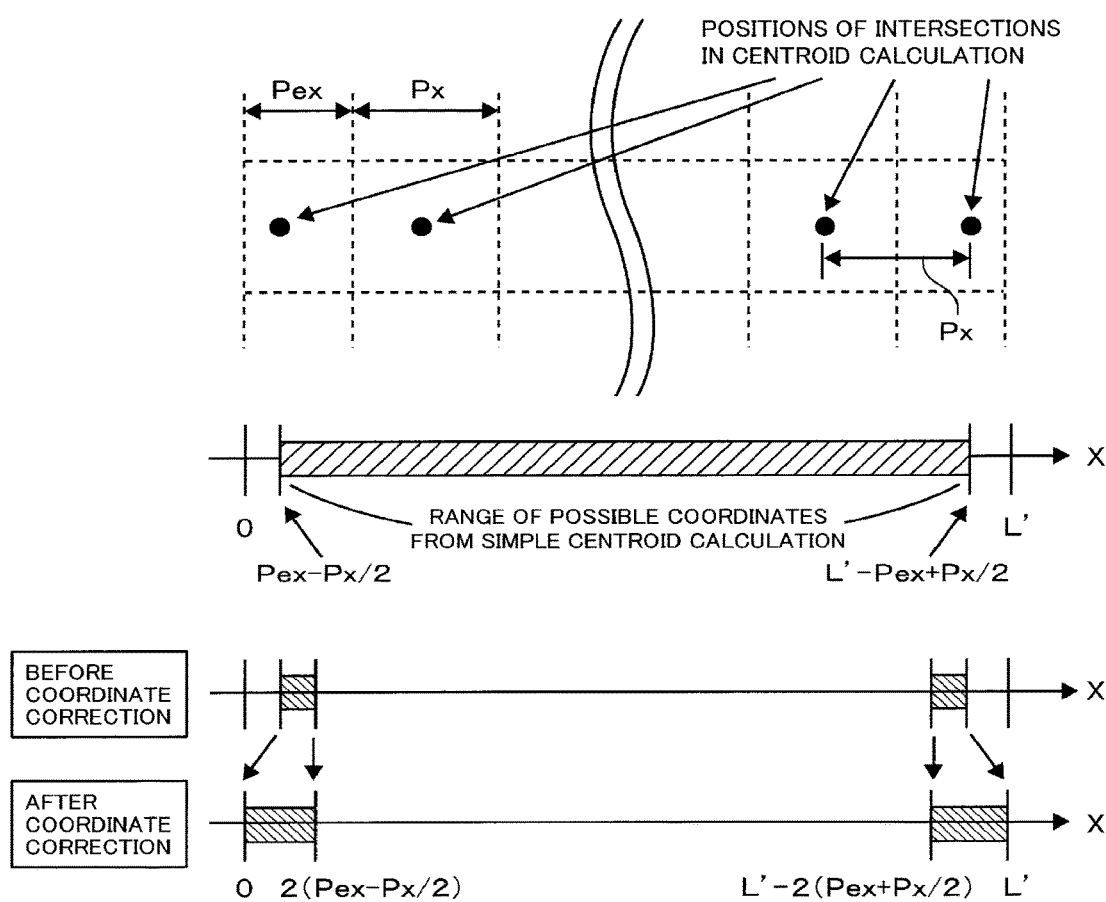
FIG. 10B is a diagram for illustrating a peripheral coordinate correction according to Embodiment 1.

FIG. 10B is a diagram for illustrating a peripheral coordinate correction according to Embodiment 1. In the pattern in which the pitch of endmost electrodes is reduced (Embodiment 1), the positions of the endmost intersections are defined so that the intersection pitch for use in the centroid calculation becomes Px. Where the pitch of endmost electrodes in the X-direction is Pex and the entire length of the pattern in the X-direction is L', the range of possible touch coordinates resulting from a simple centroid calculation is from Pex−Px/2 to L'−Pex+Px/2. In this case, a correction is made by converting a coordinate of Pex−Px/2 to 2(Pex−Px/2) into 0 to 2(Pex−Px/2) and a coordinate of L'−2(Pex+Px/2) to L'−Pex+Px/2 into L'−2(Pex+Px/2) to L'.

Although the above description has been given of an edge correction in the X-direction, an edge correction in the Y-direction is made in the same manner.

<Calibration for Each Intersection>

Because calibration values in the panel edge regions are changed by the pitch reduction, a calibration is made for each Tx-Rx intersection.

Figure 11:
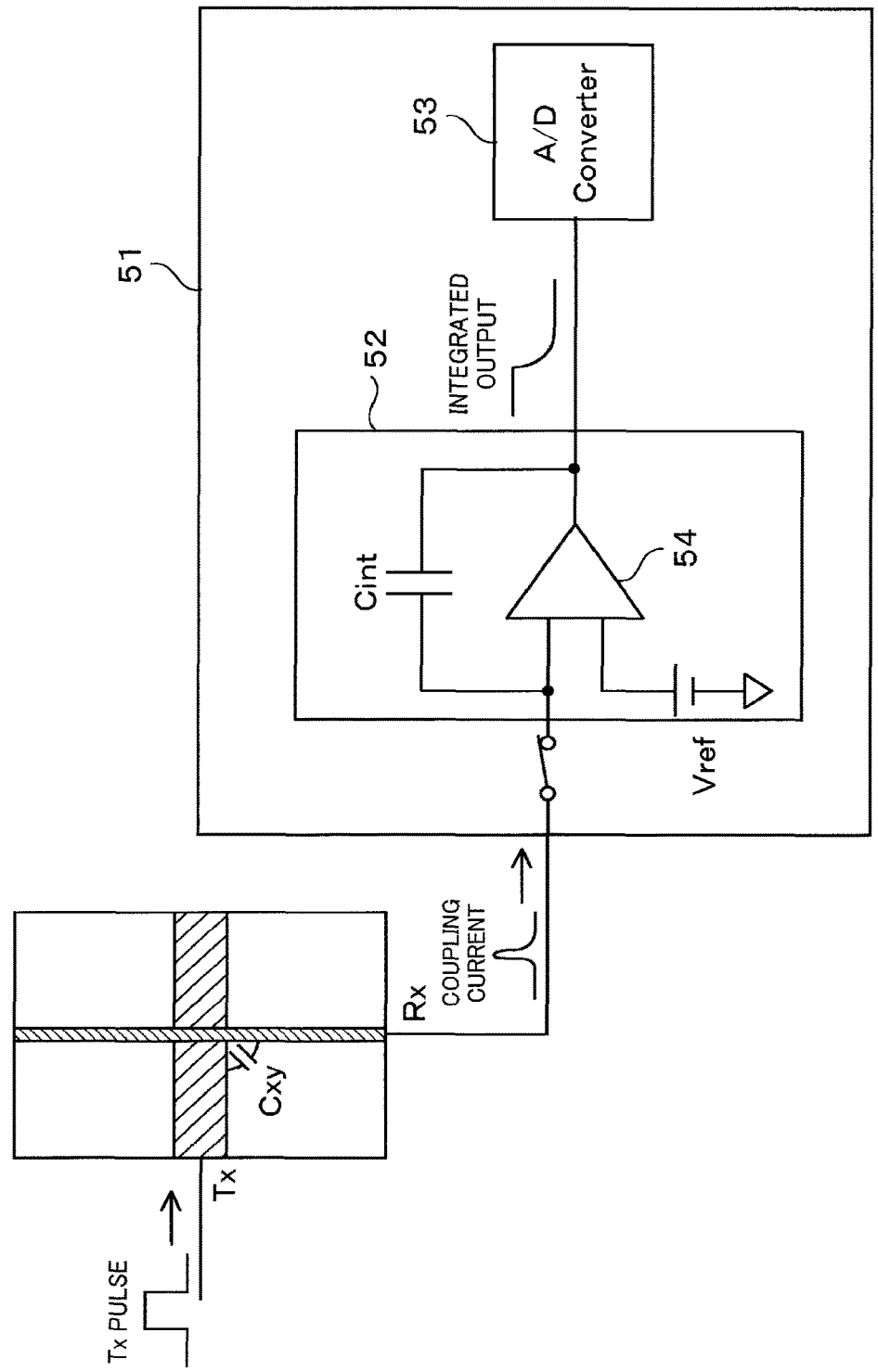
FIG. 11 is a diagram showing a basic structure of a touch detection circuit.
Figure 12A:
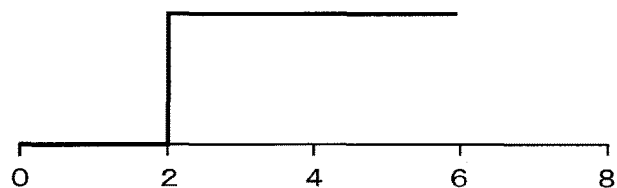
FIG. 12A to 12D are diagrams showing signal waveforms of the touch detection circuit.
Figure 12B:
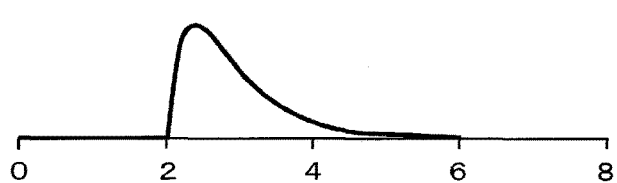
Figure 12C:
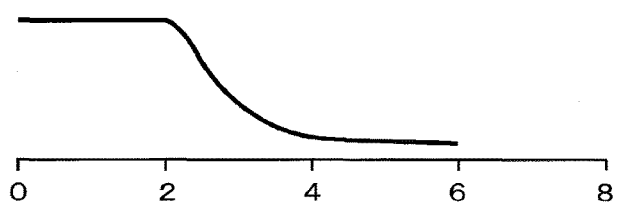
Figure 12D:
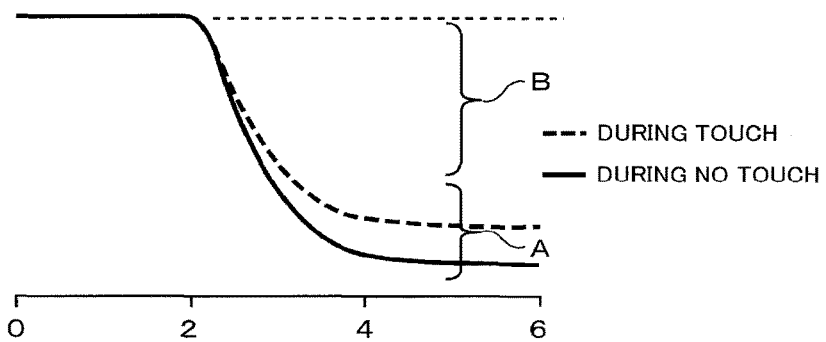

First, a description will be given of the calibration. FIG. 11 shows an example of a basic structure of a touch detection circuit (with no calibration circuit). FIGS. 12A to 12D show examples of waveforms upon detection of a touch. FIG. 12A shows a voltage waveform of a Tx pulse, FIG. 12B shows a current waveform of a coupling current, FIG. 12C shows a voltage waveform of an integrated output, and FIG. 12D shows an enlarged voltage waveform of the integrated output of FIG. 12C. The touch detection circuit 51 includes an integrating circuit 52 and an analog/digital converter circuit (A/D converter circuit or A/D converter) 53. The integrating circuit 52 includes an operating amplifier 54, an integrating capacitor Cint, and a reference voltage source Vref. When a Tx pulse as shown in FIG. 12A is applied to a Tx electrode, a pulsed coupling current based on a coupling capacitance Cxy between the Tx electrode and an Rx electrode as shown in FIG. 12B flows through the Rx electrode. This coupling current is converted into a voltage as shown in FIG. 12C by the integrating circuit 52. The output of the integrating circuit 52 (integrated output) is converted into a digital value by the A/D converter circuit 53. In this manner, a touch is detected by a variation in the coupling capacitance Cxy between Tx and Rx electrodes caused by the touch.

However, an amount of variation (ΔCxy) from the coupling capacitance Cxy during no touch to that during touch is only about 10% to about 20% of the coupling capacitance Cxy during no touch as shown in FIG. 12D. Therefore, an appropriate output range for A/D conversion is set by adding an offset to the integrated output. The addition of an offset is referred to as a calibration of the touch panel and a setting value determinative of an offset is referred to as a calibration value. Specifically, the portion B of the output of FIG. 12D is offset by the calibration so that the portion A thereof is set as the output range for A/D conversion.

Figure 13:
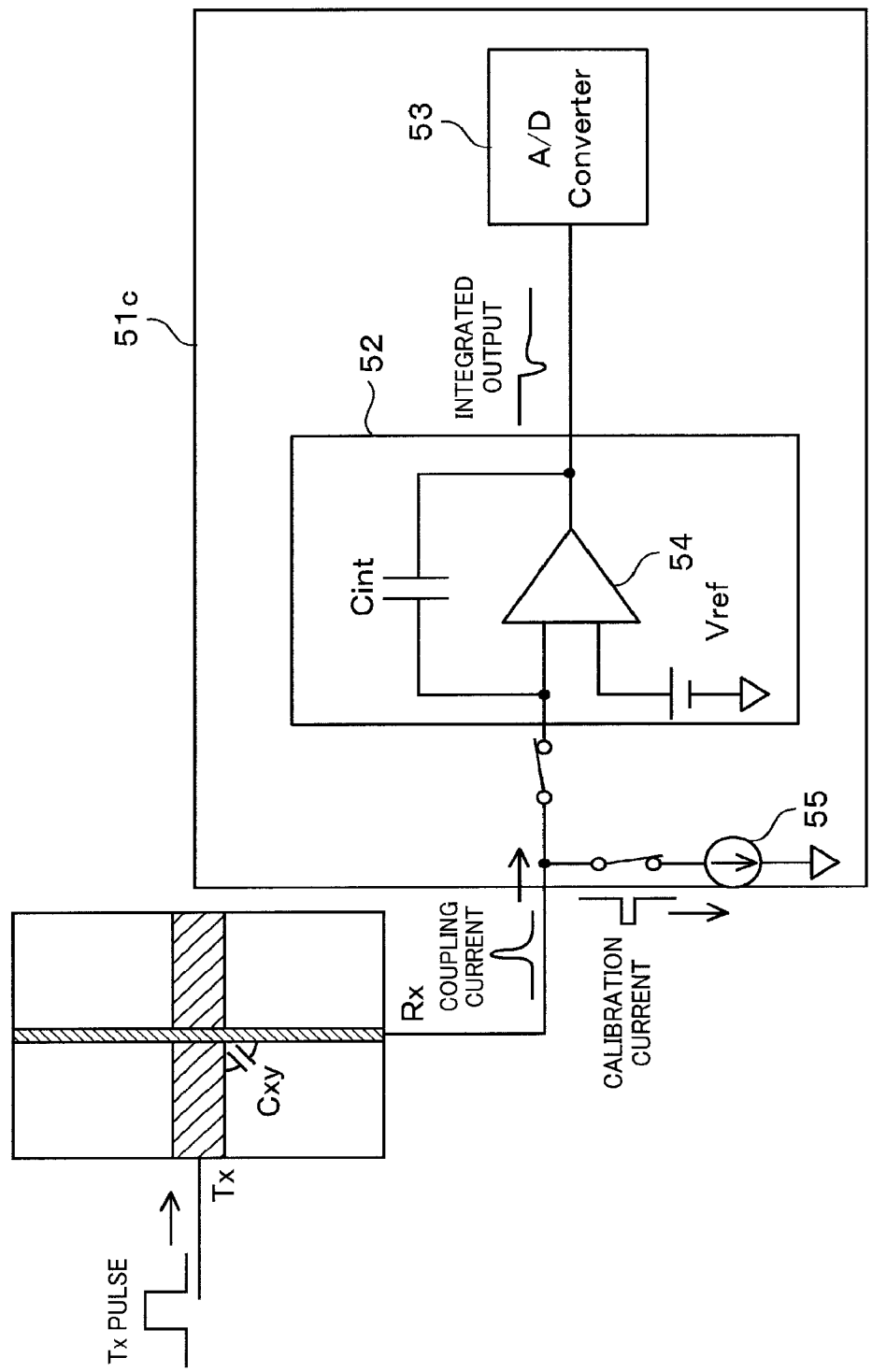
FIG. 13 is a diagram showing a basic structure of a touch detection circuit having a calibration function.

FIG. 13 is a diagram showing a basic structure of a touch detection circuit having a calibration function. The touch detection circuit 51c includes an integrating circuit 52, an A/D converter circuit 53, and a current source 55. The integrating circuit 52 includes an operating amplifier 54, an integrating capacitor Cint, and a reference voltage source Vref. In the circuit of FIG. 13, the offset is an integrated value of a calibration current. Although FIGS. 11, 12A to 12D, and 13 show waveforms of a single Tx pulse, a touch detection is generally performed by integrating a plurality of pulses per frame and per Tx electrode.

When the pitch of the endmost electrodes is reduced, Cxy at each of their intersections is also reduced roughly in proportion to the area of the intersection ((Tx pitch)×(Rx pitch)). In other words, the necessary offset differs between the endmost electrodes and the intermediate electrodes. For this reason, the calibration is made for each intersection and the resultant calibration value for each intersection is stored. The calibration is made on the display device before shipment. The calibration values are stored in a non-volatile memory, such as an EEPROM or a flash memory, and read at each start-up of the display device.

Figure 14:
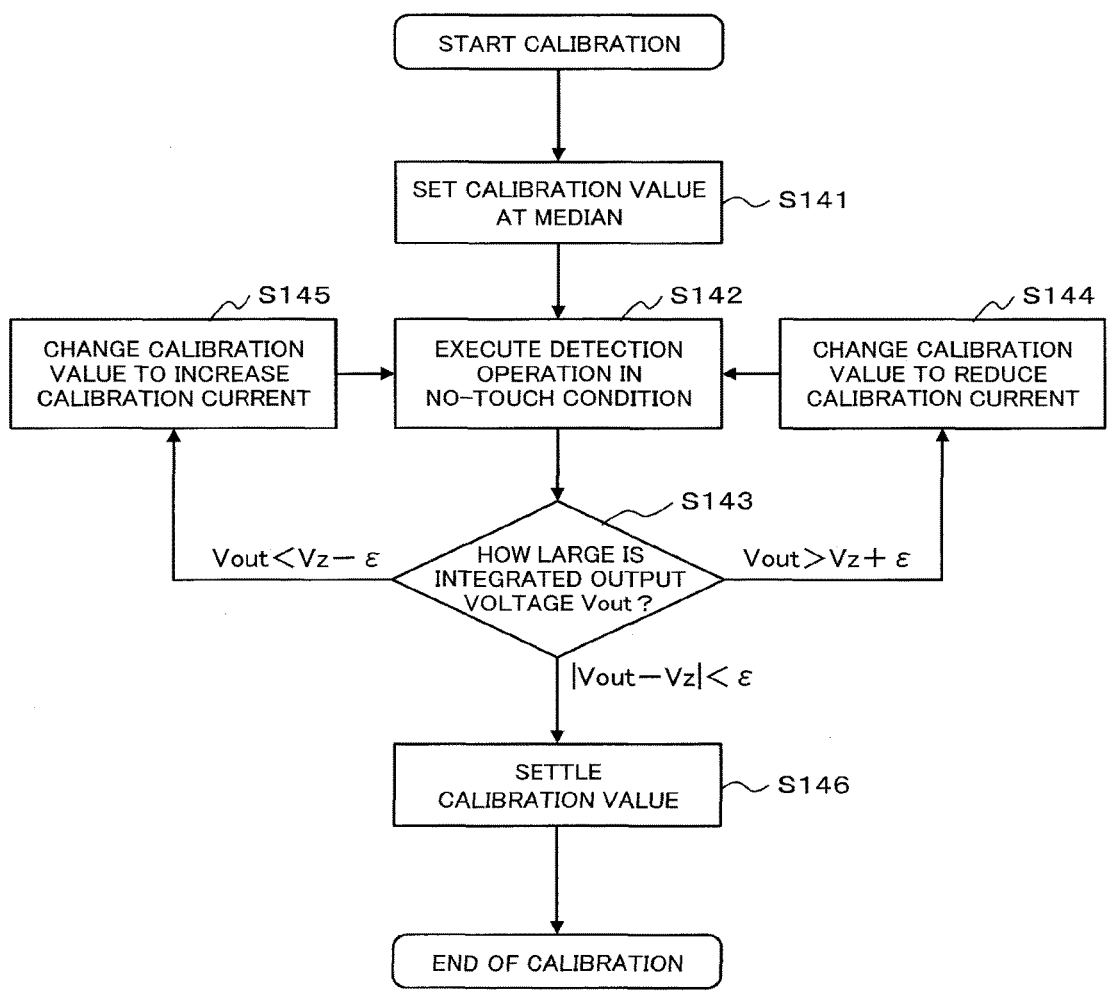
FIG. 14 is a flowchart of a calibration according to Embodiment 1.

FIG. 14 is a flowchart of a calibration according to Embodiment 1. First, the calibration value is set at a median (Step S141). Next, a detection operation is executed in a no-touch condition (Step S142). Next, the magnitude of the integrated output voltage Vout is determined, where Vz represents a calibration target voltage for Vout during no touch and ε represents a convergence criterion constant (Step S143). If Vout>Vz+ε, the calibration value is changed to reduce the calibration current (Step S144). If Vout<Vz−ε, the calibration value is changed to increase the calibration current (Step S145). If |Vout−Vz|<ε, the calibration value is settled as it is (Step S146).

While any one of the Tx electrodes is selected and a pulse is applied to the selected Tx electrode, the Rx electrodes concurrently operate. Therefore, all the Rx electrodes are concurrently calibrated for each Tx electrode. This calibration is made to every Tx electrode.

Embodiment 2

Figure 15:
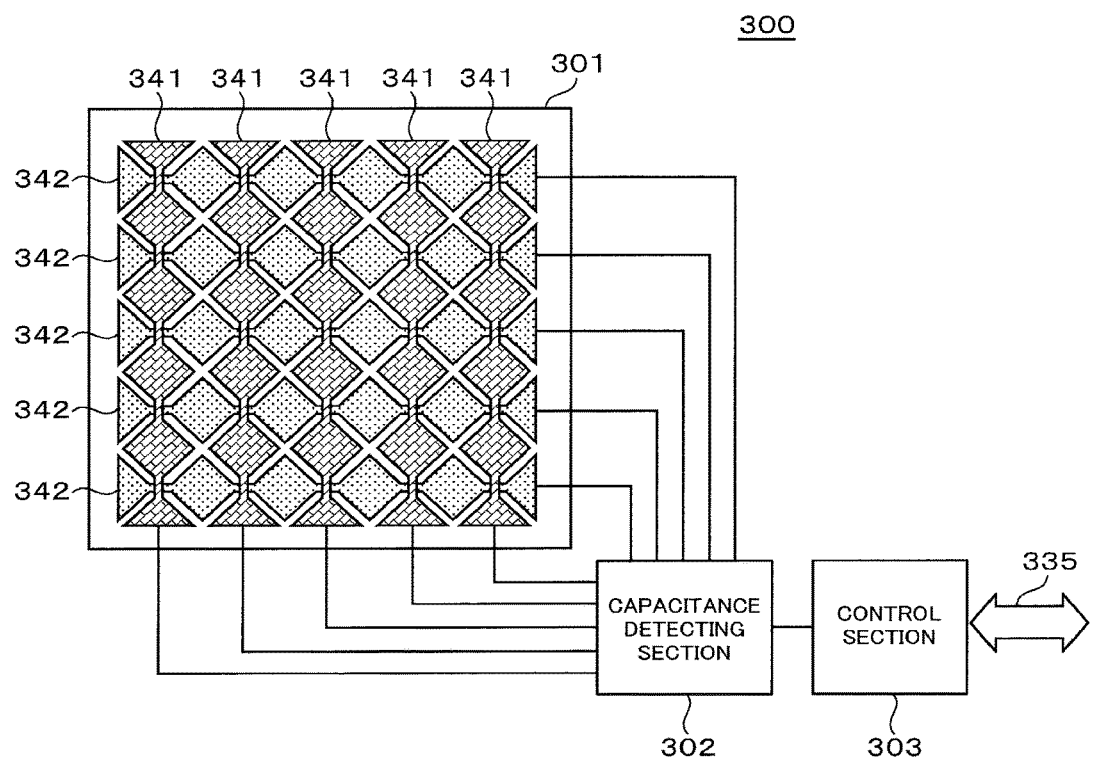
FIG. 15 is a block diagram showing a general structure of a touch panel device according to Embodiment 2.

FIG. 15 is a block diagram showing a general structure of a touch panel device according to Embodiment 2. A touch panel device 300 of this embodiment includes a capacitive touch panel 301, a capacitance detecting section 302, a control section 303, and a bus connection signal line 335. An electrode pattern (composed of X electrodes 341 and Y electrodes 342) which serves as sensor terminals for detecting a user's touch is formed on the touch panel 301. The X electrodes 341 and Y electrodes 342 are connected to the capacitance detecting section 302. The capacitance detecting section 302 is configured to sequentially apply a pulse to the X electrodes 341, with the X electrodes 341 as transmitting electrodes (drive electrodes) and the Y electrodes 342 as receiving electrodes, to measure the interelectrode capacitance (mutual capacitance) at each electrode intersection. The control section 303 is configured to detect a touch based on the above measurement results of the respective interelectrode capacitances at the electrode intersections and notify the host of the detection result via the bus connection signal line 335.

Figure 16:
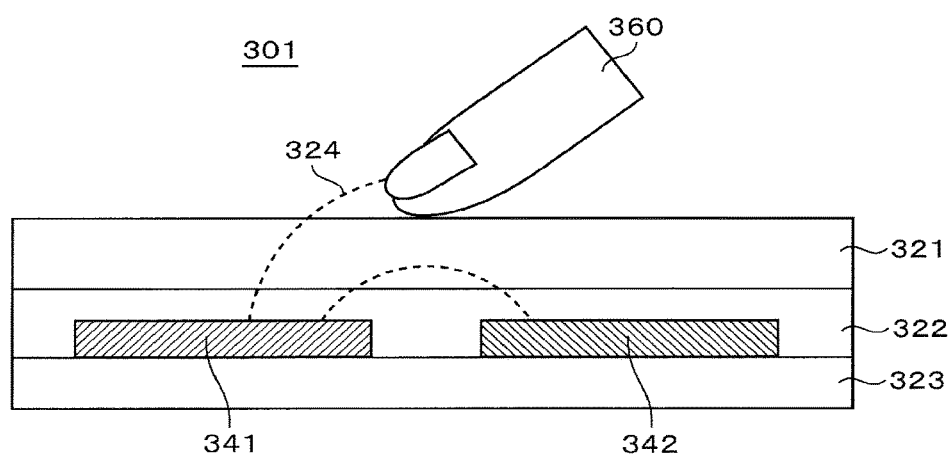
FIG. 16 is a schematic cross-sectional view showing a cross-sectional structure of a touch panel in Embodiment 2.

FIG. 16 is a schematic cross-sectional view showing a cross-sectional structure of the touch panel in Embodiment 2. The touch panel 301 has a structure in which a substrate layer 323 as a base layer, X electrodes 341 and Y electrodes 342, and a protective layer 322 are sequentially laid and a surface glass 321 is attached to the top. Needless to say, the touch panel 301 of this embodiment is mounted on a display panel (for example, a liquid crystal display panel or an organic EL display panel). FIG. 16 shows a state of electric lines of force when the touch panel 301 is touched with a finger 360. The finger (a pseudogrounded conductor) 360 functions as a shield to obstruct the electric lines of force 324. Thus, the interelectrode capacitance value (mutual capacitance value) between the X electrode 341 and the Y electrode 342 decreases.

Figure 17A:
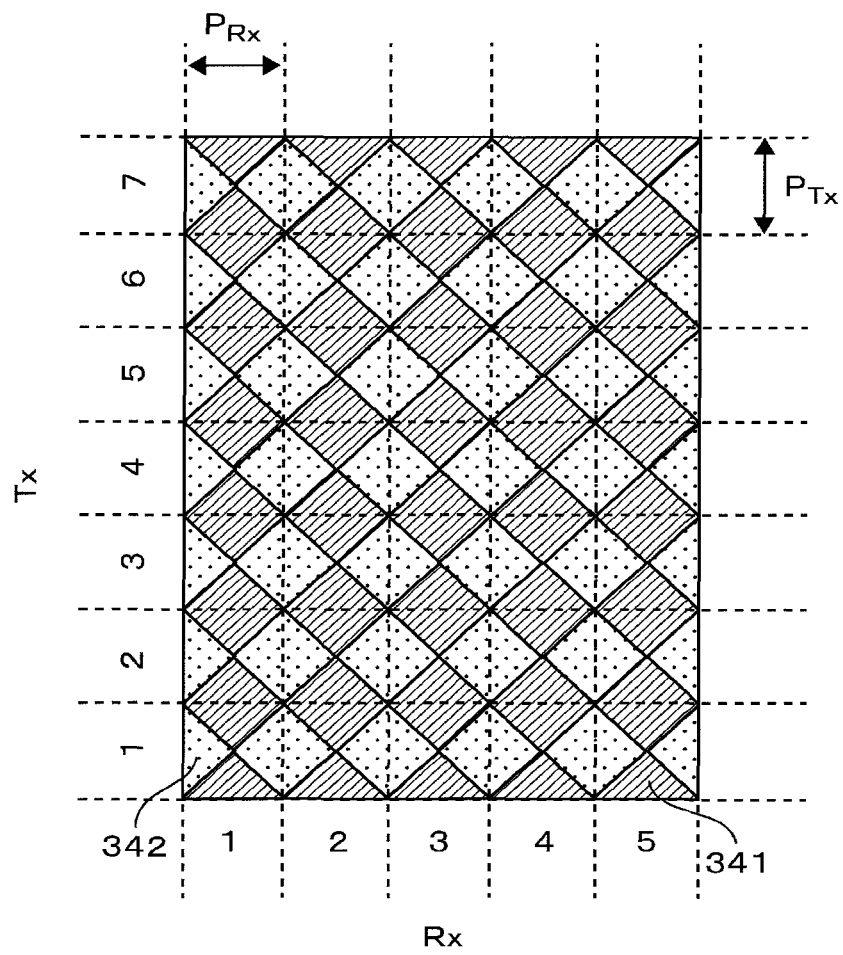
FIG. 17A is a plan view of a combination of a transmitting electrode pattern and a receiving electrode pattern according to Comparative Example 2.
Figure 17B:
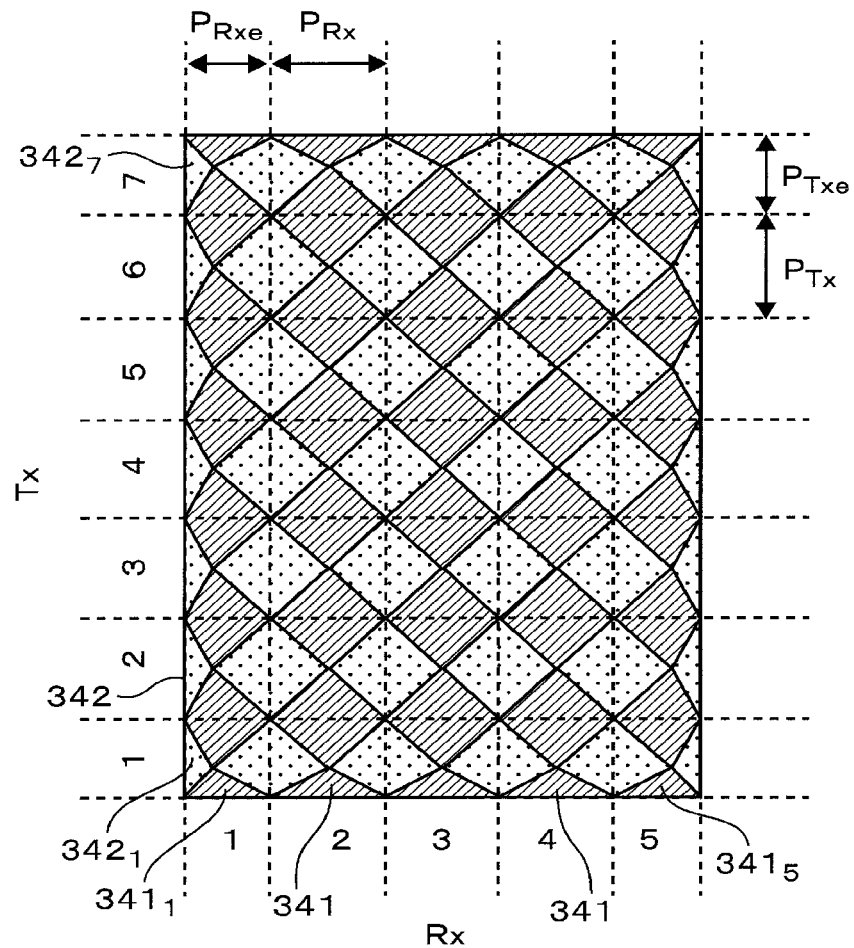
FIG. 17B is a plan view of a combination of a transmitting electrode pattern and a receiving electrode pattern according to Embodiment 2.
Figure 17C:
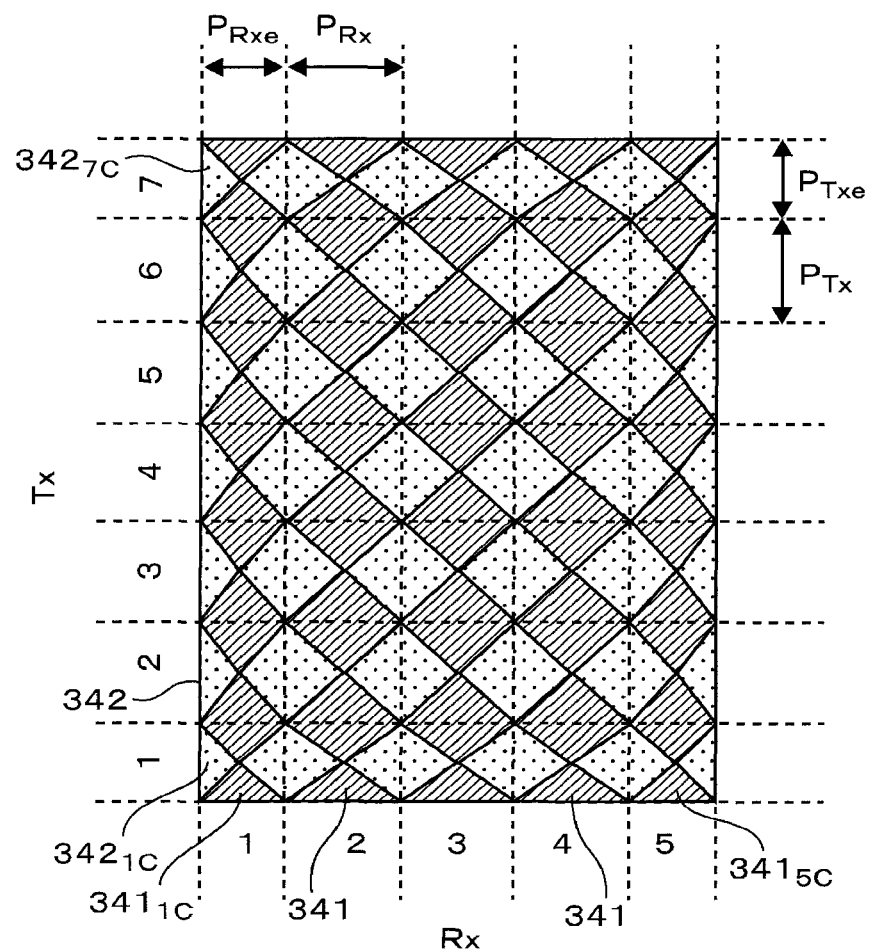
FIG. 17C is a plan view of another combination of a transmitting electrode pattern and a receiving electrode pattern according to Embodiment 2.

FIGS. 17A to 17C are views schematically showing plane patterns of electrodes of a capacitive external touch panel. For convenience of description, these figures show the case where the touch panel includes seven Y electrodes (transmitting electrodes, Tx electrodes or first electrodes) 342 and five X electrodes (receiving electrodes, Rx electrodes or second electrodes) 341. FIG. 17A shows an ordinary electrode pattern (Comparative Example 2), FIG. 17B shows a first example of this embodiment where the pitch of the endmost electrodes is changed from that in the ordinary electrode pattern (the electrode pattern is tailored in edge regions), and FIG. 17C is a second example of this embodiment where the pitch of the endmost electrodes is changed (the electrode pattern is proportionally reduced in edge regions).

In Comparative Example 2 of FIG. 17A, all the Tx electrodes 342 have equal widths and equal spacings and all the Rx electrodes 341 also have equal widths and equal spacings. The pitch ($P_{Tx}$) of each Tx electrode 342 is the distance between the pair of adjacent horizontal broken lines. All the pitches ($P_{Tx}$) of the Tx electrodes 342 are equal. The pitch ($P_{Rx}$) of each Rx electrode 341 is the distance between the pair of adjacent vertical broken lines. All the pitches ($P_{Rx}$) of the Rx electrodes 341 are equal. Each Tx electrode 342 is located in the middle between the pair of adjacent horizontal broken lines, while each Rx electrode 341 is located in the middle between the pair of adjacent vertical lines.

In the first example of FIG. 17B where the pitch of the endmost electrodes is changed, the width of the endmost Tx electrodes (Tx1, Tx7) $342_1$, $342_7$ is smaller than the width of the other Tx electrodes 342 and the pitch ($P_{Txe}$) of the endmost Tx electrodes $342_1$, $342_7$ is smaller than the pitch ($P_{Tx}$) of the other Tx electrodes 342 (i.e., $P_{Txe} < P_{Tx}$). Furthermore, the width of the endmost Rx electrodes (Rx1, Rx5) $341_1$, $341_5$ is smaller than the width of the other Rx electrodes 341 and the pitch ($P_{Rxe}$) of the endmost Rx electrodes $341_1$, $341_5$ is smaller than the pitch ($P_{Rx}$) of the other Rx electrodes 341 (i.e., $P_{Rxe} < P_{Rx}$). The points where the endmost Tx electrodes (Tx1, Tx7) $342_1$, $342_7$ intersect with the Rx electrodes are offset from the middle between the pair of adjacent horizontal broken lines towards the ends of the intersecting Rx electrodes in the Y-direction. The points where the endmost Rx electrodes (Rx1, Rx5) $341_1$, $341_5$ intersect with the Tx electrodes are offset from the middle between the pair of adjacent vertical broken lines towards the ends of the intersecting Tx electrodes in the X-direction. In this case, leaving the rhomboidal shape of a portion of the Tx electrode adjoining both of each endmost Rx electrode (for example, Rx1) and the adjacent Rx electrode (for example, Rx2) unchanged from the rhomboidal shape of other similar portions of the same Tx electrode is an ingenuity for avoiding a change of sensitivity of the Rx electrode (Rx2) next to the endmost Rx electrode (Rx1).

In the second example of FIG. 17C where the pitch of the endmost electrodes is changed, the pattern of the endmost Tx electrodes and the pattern of the endmost Rx electrodes are proportionally reduced. Although also in FIG. 17C the pitch ($P_{Txe}$) of the endmost Tx electrodes $342_{1C}$, $342_{7C}$ and the pitch ($P_{Rxe}$) of the endmost RX electrodes $341_{1C}$, $341_{5C}$ are smaller than the pitch of the other Tx electrodes and the pitch of the other Rx electrodes, respectively, FIG. 17C is different from FIG. 17B in the following point: since the regions of the endmost Rx electrodes $341_{1C}$, $341_{5C}$ are proportionally reduced, the distance between the intersection of each endmost Rx electrode $341_{1C}$, $341_{5C}$ with each Tx electrode and the intersection of the adjacent Rx electrode 341 with the same Tx electrode is different from the distance between the other pairs of adjacent intersections of the Rx electrodes with the same Tx electrode. Since the regions of the endmost Tx electrodes $342_{1C}$, $342_{7C}$ are proportionally reduced, the width of the endmost Tx electrodes $342_{1C}$, $342_{7C}$ is smaller than the width of the other Tx electrodes 342 and each endmost Tx electrode (Tx1, Tx7) $342_{1C}$, $342_{7C}$ is located in the middle between the pair of adjacent horizontal broken lines. Since the regions of the endmost Rx electrodes $341_{1C}$, $341_{5C}$ are proportionally reduced, the width of the endmost Rx electrodes $341_{1C}$, $341_{5C}$ is smaller than the width of the other Rx electrodes 341 and each endmost Rx electrode (Rx1, Rx5) $341_{1C}$, $341_{5C}$ is located in the middle between the pair of adjacent vertical broken lines. In this case, the sensitivity of the electrodes next to the endmost electrodes is slightly reduced but the coordinate accuracy can be effectively improved.

In the cases where the pitch of the endmost electrodes is changed in the above manners, the coordinate accuracy in the edge regions of the panel can be improved for the same reasons as Embodiment 1. The above improvement in the accuracy of coordinate detection enables that when a line or a figure is drawn on the touch panel, the same trace as drawn by a touch, even near the edges of the panel display, is output without distortion.

Although the invention made by the inventors has thus far been described in detail with reference to embodiments, it goes without saying that the present invention is not limited to the above embodiments and thus may be modified in various forms.

What is claimed is:

1. A touch panel comprising:
    a plurality of first electrodes arranged at predetermined pitches and extending in a first direction; and
    a plurality of second electrodes arranged at predetermined pitches and extending in a second direction,
    wherein the plurality of first electrodes and the plurality of second electrodes are arranged so that the first electrodes are overlapped with the second electrodes in plan view and spaced from the second electrodes in cross-sectional view,
    both endmost first electrodes of the plurality of first electrodes have a smaller pitch than the other first electrodes,
    both endmost second electrodes of the plurality of second electrodes have a smaller pitch than the other second electrodes and a width that is the same as the other second electrodes,
    an endmost second electrode is offset from the middle of the smaller pitch of the endmost second electrode towards an end of a first electrode in the first direction,
    a detected touch is based on a capacitance variation at one or more intersections of the plurality of first electrodes with the plurality of second electrodes,
    each pitch of the plurality of second electrodes is a distance between two vertical imaginary lines,
    each second electrode of the plurality of second electrodes other than the endmost second electrodes is in the middle of the distance between the two imaginary lines for every pitch of the plurality of second electrodes other than the endmost second electrodes,
    the endmost second electrodes are offset from the middle of the distance between the two imaginary lines towards the ends of intersecting first electrodes in the first direction, and when the detected touch is at an edge region in the second direction, a correction value is applied to the detected touch, and the correction value is approximately equal to the pitch of a second electrode of the plurality of second electrodes other than the endmost second electrodes divided by the pitch of the endmost second electrode.

2. The touch panel according to claim 1, being configured to calculate a centroid of touch response values to obtain a touch coordinate.

3. The touch panel according to claim 1, being configured to apply a corner correction value to the detected touch.

4. The touch panel according to claim 1, being configured to make a calibration for each of the intersections of the plurality of first electrodes with the plurality of second electrodes.

5. The touch panel according to claim 1,
wherein portions of the first electrodes and the second electrodes not overlapped with each other in plan view have a rhombic shape.

\* \* \* \* \*